(12) United States Patent
Soga et al.

(10) Patent No.: US 7,065,257 B2
(45) Date of Patent: Jun. 20, 2006

(54) IMAGE PROCESSING METHOD AND APPARATUS

(75) Inventors: Mineki Soga, Aichi (JP); Keiichi Yamada, Aichi (JP); Mitsuhiko Ohta, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 644 days.

(21) Appl. No.: 10/232,692

(22) Filed: Sep. 3, 2002

(65) Prior Publication Data

US 2003/0052979 A1 Mar. 20, 2003

(30) Foreign Application Priority Data

Sep. 3, 2001 (JP) ............................. 2001-265895
May 13, 2002 (JP) ............................. 2002-137779

(51) Int. Cl.
*G06K 9/40* (2006.01)

(52) U.S. Cl. ....................... 382/274; 358/520
(58) Field of Classification Search ................ 382/274
See application file for complete search history.

(56) References Cited

U.S. PATENT DOCUMENTS

| | | | |
|---|---|---|---|
| 4,315,318 A * | 2/1982 | Kato et al. | 382/264 |
| 4,868,857 A * | 9/1989 | Dobbins, III | 378/98.2 |
| 5,012,333 A * | 4/1991 | Lee et al. | 358/520 |
| 5,189,511 A * | 2/1993 | Parulski et al. | 358/518 |
| 5,387,946 A | 2/1995 | Knee | |
| 5,425,113 A * | 6/1995 | Ito | 382/254 |
| 5,454,044 A | 9/1995 | Nakajima | |
| 5,471,987 A | 12/1995 | Nakazawa et al. | |
| 5,493,622 A * | 2/1996 | Tsuchino et al. | 382/132 |
| 5,881,181 A * | 3/1999 | Ito | 382/274 |
| 5,886,751 A | 3/1999 | Wischermann | |
| 5,978,518 A * | 11/1999 | Oliyide et al. | 382/260 |

(Continued)

FOREIGN PATENT DOCUMENTS

JP 62-62373 12/1987

(Continued)

*Primary Examiner*—Bhavesh M. Mehta
*Assistant Examiner*—Sath V. Perungavoor
(74) *Attorney, Agent, or Firm*—Oblon, Spivak, McClelland, Maier & Neustadt, P.C.

(57) ABSTRACT

In an image conversion method and apparatus, luminance $Y_3$ of each pixel of a converted image is obtained by use of an expression $Y_3 = C_1 Y_1 + C_2 Y_2$ and from luminance $Y_1$ of a corresponding pixel of a source image, luminance $Y_2$ of a corresponding pixel of a low frequency image, and $C_1$ and $C_2$ which are functions of the luminance $Y_2$. Since $C_1 + C_2$ is constant when $Y_2 \leq T_2$, contrast of a low frequency component can be prevented from decreasing. In a portion in which the luminance $Y_2$ of the low frequency image is low, the low frequency image is enhanced. In a portion in which the luminance $Y_2$ of the low frequency image is high, the low frequency image is suppressed. In a method and apparatus for detecting noise level of an original signal in real time, a plurality of local regions are set on an input image in such a manner that the local regions are distributed uniformly over the entire area of an image. In each local region, determination as to whether or not luminance is saturated is performed. Variation in luminance is detected in each of a plurality of unsaturated local regions. Noise level is determined on the basis of the detected variation.

22 Claims, 26 Drawing Sheets

U.S. PATENT DOCUMENTS

| | | | |
|---|---|---|---|
| 5,982,926 A * | 11/1999 | Kuo et al. | 382/167 |
| 6,018,588 A * | 1/2000 | Kim | 382/167 |
| 6,069,979 A * | 5/2000 | VanMetter | 382/260 |
| 6,101,273 A * | 8/2000 | Matama | 382/169 |
| 6,317,521 B1 | 11/2001 | Gallagher et al. | |
| 2001/0038707 A1* | 11/2001 | Ohara | 382/132 |
| 2002/0012126 A1* | 1/2002 | Nakamura | 358/1.9 |

FOREIGN PATENT DOCUMENTS

| | | |
|---|---|---|
| JP | 6-51009 | 2/1994 |
| JP | 7-30786 | 1/1995 |
| JP | 2509503 | 4/1996 |
| JP | 8-201464 | 8/1996 |
| JP | 2663189 | 6/1997 |

* cited by examiner $$Y_1 = \begin{cases} 0 & (Y_0 < 1) \\ \dfrac{(Y_{0max})\log Y_0}{\log(Y_{0max})} & (Y_0 > 1 \text{ or } = 1) \end{cases}$$

IMAGE PROCESSING METHOD AND APPARATUS

This is a patent application based on Japanese patent application Nos. 2001-265895 and 2002-137779, which were filed on Sep. 3, 2001 and May 13, 2002, respectively, and which are incorporated herein by reference.

BACKGROUND OF THE INVENTION

1. Field of the Invention

The present invention relates to an image conversion method and apparatus for compressing the dynamic range of brightness of an image in which each pixel has a luminance value representing the density thereof. Note that in the present specification, the expression "spatial frequency" of luminance of a two-dimensional image encompasses the single-dimensional luminance frequency for each line (for each row or each column).

The present invention also relates to a noise detection method for detecting noise contained in an original signal and to an image processing apparatus utilizing the method. In particular, the present invention relates a noise detection method in which a plurality of local regions are provided in an original signal, and the noise level is detected on the basis of variation in luminance of unsaturated local regions, as well as to an image processing apparatus utilizing the method.

2. Description of the Related Art

When an image having both shady and sunny regions; i.e., an image having great contrast, is captured and displayed on a display unit having a narrow dynamic range of brightness, a dark portion of the image is displayed as a solid black region and a bright portion is displayed as a solid white region, thereby rendering an object or the like within the image difficult to discern. When gray-scale modification is performed in such a manner that a large number of gray-scale steps are imparted to a specific luminance range such as a bright range or a dark range, contrast can be increased within the specific luminance range. However, there arises a problem in that contrasts in the remaining luminance ranges decrease. In order to solve such a problem, a method of compressing the dynamic range of an image, called Homomorphic Filtering, has been employed. In Homomorphic Filtering, data regarding illumination strength, such as difference between shady and sunny regions and variation in illumination, are suppressed through removal or suppression of a low spatial frequency component of luminance, to thereby facilitate discernment of an object or the like within both shady and sunny regions of an image. FIGS. 18A and 18B illustrate the concept of Homomorphic Filtering. In FIG. 18A, luminances of pixels of a single image are subjected to logarithmic modification (log; 91) and are then passed through a high-pass filter (HPF; 92) in order to obtain image data consisting of high spatial frequency components, which are then subjected to inverse logarithmic modification ($\log^{-1}$; 93). In FIG. 18B, luminances of pixels of a single image are subjected to logarithmic modification (log; 91) and are then passed through a low-pass filter (LPF; 94) in order to obtain image data consisting of low spatial frequency components. After reversals of their signs, the thus-obtained image data are fed to an adder 95 and are added to image data obtained through the logarithmic modification (log; 91) but are not passed through the low pass filter; and the resultant image data are subjected to inverse logarithmic modification ($\log^{-1}$; 93).

In Homomorphic Filtering, the "low spatial frequency component" is suppressed uniformly. Therefore, when Homomorphic Filtering is applied to an image obtained through photographing a large white object (or a surface thereof), the object is displayed on the screen in the form of a large gray area. For example, when Homomorphic Filtering is applied to an image including a traffic control measure on a road, such as a lane mark or a pedestrian crossing, the traffic control measure is displayed as a grayish image, which in some cases is extremely difficult to recognize. Such a phenomenon occurs because a white object having low frequency component of luminance variation becomes dark relative to a white object having high frequency component of luminance, due to suppression of the low spatial frequency component. In the case of employment of a simplified method of suppressing a low spatial frequency component as measured along a single direction such as a vertical direction or a horizontal direction, the above-described problem becomes remarkable. For example, when an image containing a vertical white lane mark and a horizontal white lane mark is subjected to frequency analysis along the horizontal direction, only the horizontal white line is grayed. This image conversion process provides an image that imparts an extremely unnatural impression. For the same reason, a low frequency component of low luminance may become brighter in some cases; however, this provides an unnatural impression to a lower degree as compared to the case of a white object being displayed as a gray object. Moreover, uniform suppression of the low frequency component produces an image in which noise is conspicuous in portions of low luminance. This is because high frequency components are enhanced uniformly and relatively even in low luminance portions at which the S/N ratio of the captured image is low. When an image having a compressed dynamic range is displayed with a high average luminance, low luminance portions are displayed brighter, so that noise becomes more conspicuous in the displayed image.

In view of the foregoing, Japanese Patent Nos. 1530832, 2509503, and 2663189 propose methods for use in, for example, medical image capturing apparatuses. Japanese Patent No. 1530832 discloses an image sharpening method which increases the degree of enhancement of high frequency components in accordance with density of an image. Specifically, a reproduction image S' is obtained by the expression S'=Sorg+β(Sorg+Sus), where Sorg is an original image, Sus is a low frequency image, and β is an enhancement coefficient. The enhancement coefficient β is increased monotonously in accordance with the density of the original image or the low frequency image in order to prevent enhancement of noise. Although the sharpening method can suppress enhancement of noise, the method cannot reduce noise to a level lower than that of the original image. Moreover, the sharpening method cannot compress a dynamic range. Japanese Patent No. 2509503 discloses a method in which correction data for dynamic range compression are generated by use of a low spatial frequency component of an original signal, and the dynamic range of the original signal is compressed by use of the correction data. The correction data for dynamic range compression are obtained through comparison between a reference value and signal values obtained from an original signal. When a signal value is not less than the reference value, a constant value is output as correction data. When the signal value is less than the reference value, the correction data are obtained on the basis of the low spatial frequency component. That is, one of a bright portion and a dark portion of an image is not corrected, and the other portion is subjected to dynamic range compression. This method can prevent a white large object from being grayed, by compressing the dynamic range in a dark portion of the image only and not compressing the dynamic range in a bright portion of the image. However, the method cannot suppress noise in low luminance portions. Moreover, since the frequency characteristics change abruptly at the boundary between a bright portion and a dark portion, a pseudo-contour is generated. Japanese Patent No. 2663189 discloses a method in which a low frequency image is obtained by averaging original signals of pixels within a predetermined area in the vicinity of each pixel of an original image, and the original image is processed on the basis of the low frequency image. Specifically, the luminance of a low frequency image at each pixel is used as an argument of a monotonic decreasing function; and the output of the function is added to the density of the corresponding pixel of the original image to thereby compress the dynamic range. This method enables compression to be effected only within a desired brightness range; e.g., a bright portion or a dark portion, through setting the characteristics of the monotonic decreasing function. Generation of a pseudo-contour can be prevented by making the derivative of the monotonic decreasing function continuous. However, since the original image component is added uniformly, noise cannot be suppressed in low luminance portions.

Moreover, Japanese Patent Application Laid-Open (kokai) No. 6-51009 discloses a conventional noise measurement method and apparatus for measuring noise in an original signal. In this method, a plurality of blocks are provided in an image (FIG. 27A); an activity value A of each block is calculated; and a noise level is determined on the basis of the activity value A. The activity value A represents the degree of variation of luminance in the corresponding block and is a variance used in statistical processing. As shown in FIG. 27B, the histogram of the activity values A of all the blocks is obtained; and an activity value A at a point corresponding to K % (K=1 to 10) as calculated from the side of the lowest frequency is obtained and output as a noise value N.

Moreover, as shown in FIG. 28, by means of a comparison circuit 3, an activity value A periodically calculated by an activity-value calculation circuit 1 is compared with a noise value N stored in an accumulation circuit 2. When A<N, a first correction value is added to the noise value N, and when A>N, a second correction value, which is 10 to 100 times the first correction value, is subtracted from the noise value N, to thereby update the noise value N on a block-by-block basis. This update is repeated in order to converge the noise value N to a desired value, whereby the noise value N is obtained without obtaining the histogram.

Japanese Patent Application Laid-Open (kokai) No. 7-30786 discloses a method for measuring a noise component of a original signal, and a circuit for carrying out the method. In this method, an original signal is delayed by means of a delay circuit; and the difference between the original signal and the delayed signal is obtained in order to produce a differential absolute-value signal, to thereby detect noise stemming from fluctuation of the signal with time. Specifically, a search window serving as a block is set for the differential absolute-value signal; the maximum peak value is detected within the search window; and the minimum value among the peaks values within a plurality of search windows is obtained as a noise level.

Japanese Patent Application Laid-Open (kokai) No. 8-201464 discloses a method of detecting the S/N value of a television signal. In this method, an input original signal is divided into a plurality of blocks on an image; and in each block, differences between the original signal and a temporally averaged signal and between the original signal and a spatially averaged signal are obtained for each pixel. Subsequently, the distribution of the differential values within the block and the statistical distribution of noise values are compared for significance judgment; and the generation frequencies of differential values of blocks having been judged to be significant within the entire image are obtained. The S/N value of the original signal is detected from the distribution of the generation frequencies.

However, the noise measurement method and apparatus disclosed in Japanese Patent Application Laid-Open No. 6-51009 employs as a noise value N an activity value at a K % point of the histogram of activity values A of all blocks within an image. Therefore, a problem arises in that the estimated noise value greatly depends on the characteristics of the original image (noise free). Specifically, when a large portion of the original image is saturated, the number of blocks having small activity values increases, whereby the noise value, which is a K % point activity value, decreases. By contrast, when a small portion of the original image is saturated, the number of blocks having large activity values increases, whereby the noise value, which is a K % point activity value, increases. Moreover, when the original image contains much amount of high frequency components throughout the entire image, the number of blocks having large activity values increases, whereby the noise value, which is a K % point activity value, increases. By contrast, when the original image contains much amount of low frequency components throughout the entire image, the number of blocks having small activity values increases, whereby the noise value, which is a K % point activity value, decreases.

Moreover, in the method, on the basis of results of comparison between the estimated noise value and an activity value of a new block, a first correction value is added to the estimated noise value, or a second correct value is subtracted from the estimated noise value; and this step is repeated in order to converge the noise value to an appropriate value. However, the converged results of the noise value depend on the magnitudes of the first and second correct values relative to the noise level. Specifically, when the first and second correct values are relatively large as compared with the noise value N, variation in the converged value is large, although the noise value N converges through relatively few iterations of comparison. By contrast, when the first and second correct values are relatively small as compared with the noise value N, the number of iterations of comparison required for convergence increases, although variation in the converged value is small. That is, in some cases, the noise value N does not converge even after comparison is performed for all blocks within the image. Therefore, the method has a drawback in that a rough value of the noise value N must be known in order to properly determine the first and second correction values and to converge the noise value without fail.

In the method and circuit for measuring a noise component of an original signal disclosed in Japanese Patent Application Laid-Open No. 7-30786, the maximum value within a search window of a differential absolute-value signal between an original signal and its delay signal represents the peak of a noise component of the input image when no motion is present within the search window and represents the peak of the sum of a motion component and a noise component when a motion is present within the search window. Specifically, in a plurality of search windows, the minimum value among the maximum values of the search windows is detected to thereby detect the peak value of the noise component that does not contain any motion component. Therefore, the method and circuit premise that an image does not move in any of the plurality of search windows. However, in the case of an image captured by use of a moving camera such as a camera mounted on a vehicle, all the peak values detected in the search windows contain motion components, because motion occurs over the entire image. In other words, the method has a drawback in that when noise of an image captured by use of a moving camera is measured, the level of noise is detected to be greater than the actual level.

In the method of detecting the S/N value of a television signal disclosed in Japanese Patent Application Laid-Open No. 8-201464, in each block of an input original signal, differences between the original signal and a temporally averaged signal and differences between the original signal and a spatially averaged signal are obtained for each pixel; and the distribution of the differential values and the known statistical distribution of noise values are compared for significance judgment. In other words, the presence/absence of a motion within each block is judged from the distribution of the differences between the input original signal and the temporally averaged value thereof; and the presence/absence of a variation component (edge) of the image within each block is judged from the distribution of the differences between the input original signal and the spatially averaged value thereof. This method has a drawback of high calculation cost, because judgment of significance is performed in each block through comparison with the statistical distribution of noise values.

SUMMARY OF THE INVENTION

The present invention has been accomplished in order to solve the above-described problems, and its object is to provide an image conversion method and apparatus which can prevent a dark portion from being converted to a solid black region, prevent noise in a dark portion from becoming conspicuous, and prevent a large white object (or its region) from being displayed as a grayish area on an image.

Another object of the present invention is to provide an image conversion method and apparatus which can reduce the degree of unnaturalness of a converted image even when a single dimensional frequency such as that measured along a single direction (a vertical direction or a horizontal direction) of an image is used as a low spatial frequency component.

Still another object of the present invention is to detect luminance variations of a plurality of unsaturated local regions set on an image and properly detect noise of the image on the basis of the plurality of detected variations.

Yet another object of the present invention is to provide a method of accurately detecting the noise level of an image irrespective of motion components of the image, the area of a saturated portion within an image, and high frequency components present within the image, even when a rough noise level is unknown, as well as an image processing apparatus utilizing the method.

A further object of the present invention is to provide a method of producing images of high visibility at all times by turning on and off a dynamic range compression function, or changing the degree of compression, on the basis of the level of noise contained in input images, as well as an image processing apparatus utilizing the method.

The present invention provides an image conversion method of processing a source image in which each pixel has a luminance value, in order to compress the dynamic range of the image in terms of brightness. The method comprises a low-frequency-image extraction step of extracting a low frequency image consisting of a low frequency component of the source image in terms of variation in luminance; a coefficient determination step of obtaining two coefficients $C_1$ and $C_2$ from luminance $Y_2$ of each pixel of the low frequency image corresponding to luminance $Y_1$ of a corresponding pixel of the source image; and a linear computation step of obtaining luminance $Y_3$ of a corresponding pixel of a converted image by use of an expression $Y_3=C_1Y_1+C_2Y_2$ and from the two coefficients $C_1$ and $C_2$, the luminance $Y_1$ of the corresponding pixel of the source image, and the luminance $Y_2$ of the pixel of the low frequency image. Each of the coefficients $C_1$ and $C_2$ is a continuous function of luminance $Y_2$ of a pixel of the low frequency image; the coefficient $C_1$ is positive or zero; and the coefficient $C_2$ is a monotonic decreasing function in a broad sense, in a continuous first range where the luminance $Y_2$ assumes a minimum value, such that the coefficient $C_2$ assumes a positive value, becomes zero, and then assumes a negative value, and is a monotonic increasing function in a broad sense, in a continuous second range where the luminance $Y_2$ assumes a maximum value, such that the coefficient $C_2$ assumes a negative value or zero.

The present invention also provides an image conversion apparatus for processing a source image in which each pixel has a luminance value in order to compress the dynamic range of the image in terms of brightness. The apparatus comprises low-frequency-image extraction means for extracting a low frequency image consisting of a low frequency component of the source image in terms of variation in luminance; first and second coefficient determination means for obtaining two coefficients $C_1$ and $C_2$, respectively, from luminance $Y_2$ of each pixel of the low frequency image output from the low-frequency-image extraction means; linear computation means for obtaining luminance $Y_3$ of a corresponding pixel of a converted image by use of an expression $Y_3=C_1Y_1+C_2Y_2$ and from the two coefficients $C_1$ and $C_2$ obtained by the first and second coefficient determination means, the luminance $Y_2$ of the pixel of the low frequency image output from the low-frequency-image extraction means, the luminance $Y_2$ having been used for determination of the coefficients $C_1$ and $C_2$, and luminance $Y_1$ of a corresponding pixel of the source image. Each of the coefficients $C_1$ and $C_2$ is a continuous function of luminance $Y_2$ of a pixel of the low frequency image; the coefficient $C_1$ is positive or zero; and the coefficient $C_2$ is a monotonic decreasing function in a broad sense, in a continuous first range where the luminance $Y_2$ assumes a minimum value, such that the coefficient $C_2$ assumes a positive value, becomes zero, and then assumes a negative value, and is a monotonic increasing function in a broad sense, in a continuous second range where the luminance $Y_2$ assumes a maximum value, such that the coefficient $C_2$ assumes a negative value or zero.

In the image conversion method and apparatus according to the present invention, since the two coefficients $C_1$ and $C_2$ are obtained from luminance $Y_2$ of each pixel of a low frequency image which corresponds to luminance $Y_1$ of a corresponding pixel of a source image, the degree of suppression of a low frequency component can be changed in accordance with luminance of the low frequency component such as illumination intensity. The coefficient $C_1$ is a continuous function and is positive or zero. The coefficient $C_2$ is a continues function. The coefficient $C_2$ is a monotonic decreasing function in a broad sense, in a first range where the luminance $Y_2$ assumes a minimum value, such that the coefficient $C_2$ assumes a positive value, becomes zero, and then assumes a negative value, and is a monotonic increasing function, in a second range where the luminance $Y_2$ assumes a maximum value, such that the coefficient $C_2$ assumes a negative value or zero. Therefore, in a range in which the luminance $Y_2$ assumes a minimum value and the coefficient $C_2$ assumes a positive value; i.e., in a low luminance portion, a low frequency component is enhanced as compared with the source image, whereby the noise component can be suppressed as compared with the source image. In a range in which the coefficient $C_2$ decreases monotonously and assumes a negative value, since the degree of suppression of the low frequency component decreases as the luminance $Y_2$ decreases, the degree of enhancement of a high frequency component decreases relatively as the S/N ratio of the captured image decreases, whereby noise is prevented from becoming conspicuous. Moreover, in a range in which the luminance $Y_2$ assumes a maximum value and the coefficient $C_2$ increases monotonously such that the coefficient $C_2$ assumes a negative value or zero, the degree of suppression of the low frequency component decreases as the luminance $Y_2$ increases. Therefore, the degree of suppression of a low frequency component of high luminance decreases, so that an image of a white object that accounts for a large portion of the image can be prevented from being grayed.

In the image conversion method and apparatus according to the present invention, preferably, the sum of the two coefficients $C_1$ and $C_2$ assumes a constant value at least within a continuous third range within the entire range of the luminance $Y_2$. In this case, the transmission ratio of a zero spatial frequency component in the converted image becomes constant, whereby decrease in contrast can be prevented in that range.

More preferably, the sum of the two coefficients $C_1$ and $C_2$ is constant over the entire range of the luminance $Y_2$. In this case, decrease in contrast of a low frequency component can be prevented over the entire luminance range.

More preferably, within a continuous fourth range within the third range of the luminance $Y_2$, the coefficient $C_1$ assumes a constant positive value, and the coefficient $C_2$ assumes a constant negative value. In this case, the degree of suppression of the low frequency component becomes constant in that range, so that the dynamic range can be compressed at a constant compression ratio in that range.

In the image conversion method and apparatus according to the present invention, preferably, $C_2/C_1$ is a monotonic decreasing function of the luminance $Y_2$ in a broad sense in the first range of the luminance $Y_2$ and is a monotonic increasing function of the luminance $Y_2$ in a broad sense in the second range of the luminance $Y_2$. Since $C_2/C_1$ is a monotonic decreasing function of the luminance $Y_2$ in a broad sense in the first range of the luminance $Y_2$, the degree of suppression of the low frequency component is lowered as the luminance $Y_2$ decreases in the first range (a low luminance portion). Therefore, in a dark portion having a low S/N ratio, the degree of enhancement of a high frequency component decreases relatively, so that noise is not conspicuous and the frequency characteristic changes continuously, whereby a natural image can be obtained. Moreover, since $C_2/C_1$ is a monotonic increasing function of the luminance $Y_2$ in a broad sense in the second range of the luminance $Y_2$, the degree of suppression of the low frequency component is lowered as the luminance $Y_2$ increases in the second range (a high luminance portion). Therefore, darkening of a large area of high luminance (graying of a white area) does not occur. Notably, when $C_2/C_1$ is a monotonic decreasing function of the luminance $Y_2$ in a narrow sense in the first range of the luminance $Y_2$ and a monotonic increasing function of the luminance $Y_2$ in a narrow sense in the second range of the luminance $Y_2$, the above-described effects become more remarkable.

More preferably, the coefficient $C_1$ assumes a constant positive value in a range which includes the entire fourth range of the luminance $Y_2$ and covers a greater range than the fourth range. In this case, the degree of suppression of the low frequency component decreases as the luminance $Y_2$ increases in a high luminance portion, whereby contrast of the high luminance portion can be increased.

When the sum of the two coefficients $C_1$ and $C_2$ is constant over the entire range of the luminance $Y_2$, preferably, $C_1$ is zero in a continuous fifth range where the luminance $Y_2$ assumes the minimum value; $C_2$ is zero in a continuous sixth range where the luminance $Y_2$ assumes the maximum value; and $C_1$ is a constant positive value and $C_2$ is a constant negative value within at least a continuous portion between the fifth and sixth ranges. In this case, there can be obtained a converted image which includes only a low frequency component in the continuous fifth range where the luminance $Y_2$ assumes the minimum value, so that noise can be suppressed greatly. This is particularly effective in the case in which the noise level in a low luminance portion is high. Further, since the degree of suppression of the low frequency component becomes zero in a continuous sixth range where the luminance $Y_2$ assumes the maximum value, darkening of a large area (graying of a white area) does not occur in the sixth range (high luminance portion). Moreover, since $C_1$ is a constant positive value and $C_2$ is a constant negative value with the continuous range between the fifth and sixth ranges, the low frequency component is suppressed uniformly in that range, so that the dynamic range can be compressed at a constant compression ratio.

In the image conversion method according to the present invention, preferably, extraction of the low frequency image is performed based on one dimensional frequency analysis along each pixel line. In the image conversion apparatus according to the present invention, preferably, the low-frequency-image extraction means extracts the low frequency image based on one dimensional frequency analysis along each pixel line.

In the present invention, when extraction of a low frequency image is performed while its low spatial frequency is measured single-dimensionally; i.e., along a single direction (a vertical direction or a horizontal direction) of an image, at an edge portion with respect to a direction along which the extraction of the low frequency image is not performed, generation of overshoot or undershoot attributable to suppression of a low frequency component can be suppressed. That is, a more natural converted image is obtained. Moreover, since the extraction of the low frequency image is performed single-dimensionally, a simple image conversion method can be attained, and a simple, high-speed image conversion apparatus can be attained.

The present invention provides an image noise detection method comprising steps of setting a plurality of local regions on an input image in such a manner that the local regions are distributed substantially uniformly over the entire area of a image; determining whether or not luminance in each local region is saturated; detecting variation in luminance in each of a plurality of unsaturated local regions; and determining noise level on the basis of the detected variation.

The present invention further provides an image processing apparatus which improves visibility of an input image, the image processing apparatus including noise measurement means which comprises local regions setting means for setting a plurality of local regions on an input image in such a manner that the local regions are distributed substantially uniformly over the entire area of an image; saturation judgment means for judging whether or not luminance in each local region is saturated; variation detection means for detecting variation in luminance in each of a plurality of unsaturated local regions; and noise level determination means for determining noise level on the basis of the detected variation.

In the image noise detection method and the image processing apparatus according to the present invention, a plurality of local regions are first set on an input image in such a manner that the local regions are distributed substantially uniformly over the entire area of an image. As shown in FIG. 21, the local regions correspond to sections A to E, etc. set on an original signal which is output from an image capturing unit and contains noise. FIG. 21 shows an example of single-dimensional local regions; however, the local regions may be two-dimensional. Subsequently, determination as to whether or not luminance in each local region is saturated is performed. The reason why this determination is performed is that if luminance is saturated in a local region, noise in the local region cannot be detected accurately, because the noise is buried under the saturation value (FIG. 22). When noise level is determined on the basis of a k % point (k=1 to 10) of variation obtained from variations in the plurality of local regions or the minimum variation without consideration of saturated regions as in a conventional technique, a noise level smaller than the actual noise level may be detected.

Therefore, in the image noise detection method and the image processing apparatus according to the present invention, variation in luminance is detected in a plurality of local regions having been judged to be unsaturated (hereinafter referred to as "unsaturated local regions"). The variation is a statistical variance, for example. A relation as shown in FIG. 22 exists between luminance variation and level of noise contained in an original signal. Specifically, in local regions other than a saturated local region C, in particular, in a local region, such as a local region A, in which an edge or density gradient is not present, a noise signal is mainly present, so that a variation coefficient $N_A$ becomes small. By contrast, in local regions in which luminance of an image changes; e.g., in local regions B, D, and E in which an edge or density gradient is present, detected variation coefficients $N_B$, $N_D$, and $N_E$ become large. In other words, a correlation exists between luminance variation (variation coefficient) and noise level. Therefore, variation in luminance is detected in each of unsaturated local regions and is used as an index of noise level of the image.

Unlike the case of the conventional technique, in the image noise detection method and the image processing apparatus according to the present invention, noise level can be detected accurately without any influence of a saturated signal. Moreover, unlike the case of the conventional technique, a threshold value or correction value which depends on noise level is not used. Therefore, noise level can be determined accurately even when a rough value of noise level is unknown.

The image noise detection method and the image processing apparatus according to the present invention are based on the premise that at least one of a plurality of unsaturated local regions on a image is a uniform region which does not contain an edge or density gradient. In the case of an image obtained by capturing an outdoor scene, the above premise holds when the size of local regions is determined properly. For example, a wall surface of a building, sky, or a road surface produces a uniform unsaturated local region which does not contain an edge or density gradient.

The image noise detection method and the image processing apparatus according to the present invention can be applied to stationary images and moving images. That is, the image noise detection method and the image processing apparatus according to the present invention are effective for a moving image such as an image captured by a camera mounted on a vehicle. Although an image captured by a vehicle-mounted camera moves over the entire image, when a single-dimensional or two-dimensional local region is set within a single frame, luminance variation due to motion is not produced in the local region. Therefore, noise level can be detected accurately even when motions exist over the entire image.

In the image noise detection method according to the present invention, preferably, the noise level is determined on the basis of a minimum variation, or on the basis of a smallest class variation. In the image processing apparatus according to the present invention, preferably, the noise level determination means determines the noise level on the basis of a minimum variation, or on the basis of a smallest class variation. In these cases, when a luminance variation stemming from a factor other than noise is present, the detected variation becomes larger as compared with the case in which such a luminance variation is not present. Therefore, when variations in a plurality of unsaturated local regions are calculated, the minimum variation or a variation of the smallest class can serve as an index that indicates an accurate noise level. The minimum variation or the smallest class variation can be obtained with ease. In other words, noise level can be obtained accurately with ease.

In the image noise detection method according to the present invention, preferably, the noise level is determined on the basis of a time-average relevant value obtained from a plurality of minimum variations detected at different points in time, respectively, or on the basis of a time-average relevant value obtained form a plurality of smallest-class variations detected at different points in time, respectively. In the image processing apparatus according to the present invention, preferably, the noise level determination means comprises temporally averaging means for calculating a time-average relevant value from a plurality of minimum variations detected at different points in time, respectively, or a time-average relevant value from a plurality of smallest-class variations detected at different points in time, respectively. Here, the term "time-average relevant value" means the mean or weighted mean of variations within a predetermined period of time, the sum or weighted sum of variations within a predetermined period of time, or the like. Any of these values can be used. Since the minimum variation or the smallest class variation is represented by a time-average relevant value, the short-term variation of the detected noise level can be reduced. Therefore, a stable detection result regarding noise level can be obtained.

In the image noise detection method and the image processing apparatus according to the present invention, preferably, the variation is a variance of luminance within the corresponding unsaturated local region. Variation is a statistical concept and can be represented most accurately by statistical variance. Therefore, when the variation is variance, noise level can be detected accurately.

In the image noise detection method and the image processing apparatus according to the present invention, preferably, the variation is an average of absolute values of differences between average luminance and luminance of each pixel within the corresponding unsaturated local region.

In this case, the variation can be detected with ease through computation of absolute values and computation for addition and averaging, without performance of square calculation as in the case of variance.

In the image noise detection method and the image processing apparatus according to the present invention, preferably, the variation is a differences between maximum and minimum values of luminance within the corresponding unsaturated local region.

When variance is used as a variation, the detected noise level is equivalent to the mean value of noise. By contrast, when the difference between the maximum value and the minimum value is used as a variation, the detected noise level is equivalent to the peak value of noise. In other words, use of the difference between the maximum value and the minimum value is one method for representing noise level. When the difference between the maximum value and the minimum value of luminance in each unsaturated local region is used as a variation, determining noise level requires only comparison. Therefore, variation can be detected in a simplified manner.

Preferably, the image processing apparatus according to the present invention further comprises dynamic range compression means for compressing dynamic range by suppressing a low spatial frequency component of the input image; and control means for controlling the dynamic range compression means on the basis of the noise level measured by the noise measurement means.

In image processing for processing an image captured by a camera mounted on a vehicle, a lane mark on a road surface or an obstacle on a road is detected, and in such a case, an edge is generally extracted as a feature. In image processing for outdoor scenes, a camera equipped with an AGC function is used as an image capturing means in order to cope with variation in brightness such as variation between day and night. The noise level of an image captured at a dark place or at night is high, because the amplification factor is increased by the AGC. When such an image of high noise level is subjected to the same image processing as that employed for images captured at a bright place or in the daytime, a problem may occur. In the case of lane mark detection, a noise component is detected as an edge and is handled as a candidate of the lane mark. In such a case, the noise level measurement means of the image processing apparatus of the present invention measures the noise level of the original signal accurately and efficiently, and outputs the results to the control means. On the basis of the measurement results, the control means adjusts a threshold value which is used for binarization of the edge. Alternatively, the control means increases the degree of suppression of noise. This enables extraction of a feature without influence of image noise. By virtue of the above configuration, image processing can be performed more properly, without influence of image noise, for an image of high noise level such as an image captured at night.

Moreover, the present invention provides an image processing apparatus which improves visibility of an input image. The apparatus comprises noise level measurement means for measuring noise level of an input image; dynamic range compression means for compressing dynamic range by suppressing a low spatial frequency component of the input image; and control means for controlling the dynamic range compression means on the basis of the noise level measured by the noise level measurement means.

In image processing, there has been used a method of compressing the dynamic range of luminance by suppressing a low spatial frequency component. The noise level of an image captured at night is high, because the amplification factor is increased by means of an AGC. When such an image of high noise level is subjected to dynamic range compression processing, noise is enhanced. In such a case, the noise level of the original signal is measured by the noise level measurement means, and the measurement results are fed to the control means. On the basis of the measurement results, the control means switches the output original signal to the original signal from the original signal output from the dynamic range compression means. Alternatively, on the basis of the measurement results, the control means lowers the degree of suppression of a low spatial frequency component by the dynamic range compression means. Thus, enhancement of image noise is avoided. By virtue of the above configuration, proper image processing can be performed without enhancing noise even for an image of high noise level such as an image captured at night.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF THE PREFERRED EMBODIMENTS

The present invention will next be described in detail with reference to embodiments, which should not be construed as limiting the invention thereto.

First Embodiment

Figure 1:
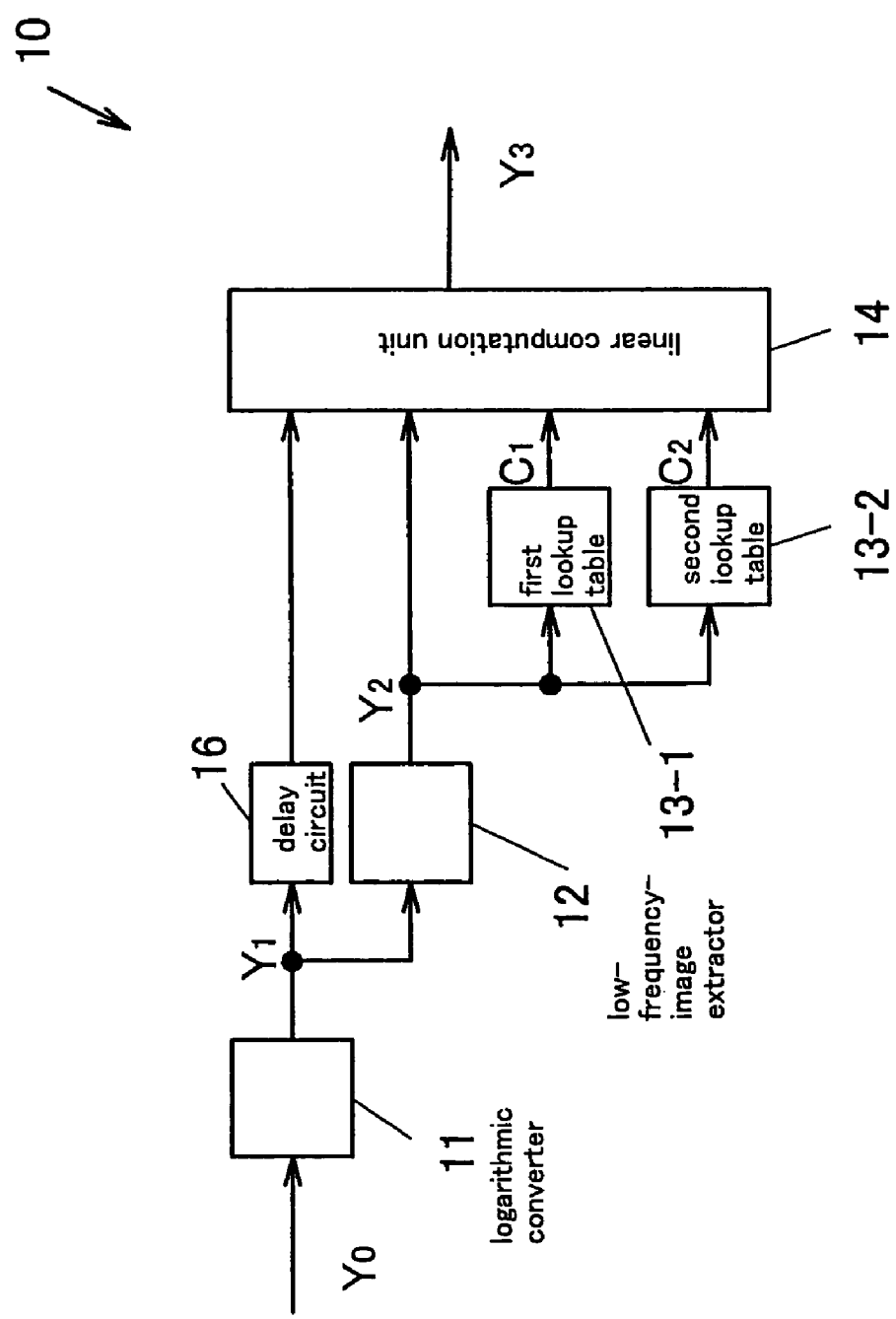
FIG. 1 is a block diagram showing the configuration of an image conversion apparatus according to a first embodiment of the present invention.
Figure 18A:
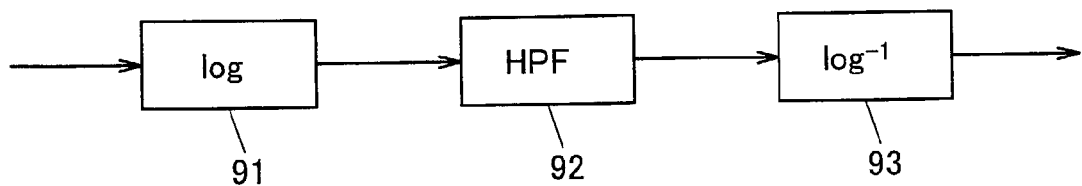
FIGS. 18A and 18B are block diagrams showing two different configurations for Homomorphic Filtering.
Figure 18B:
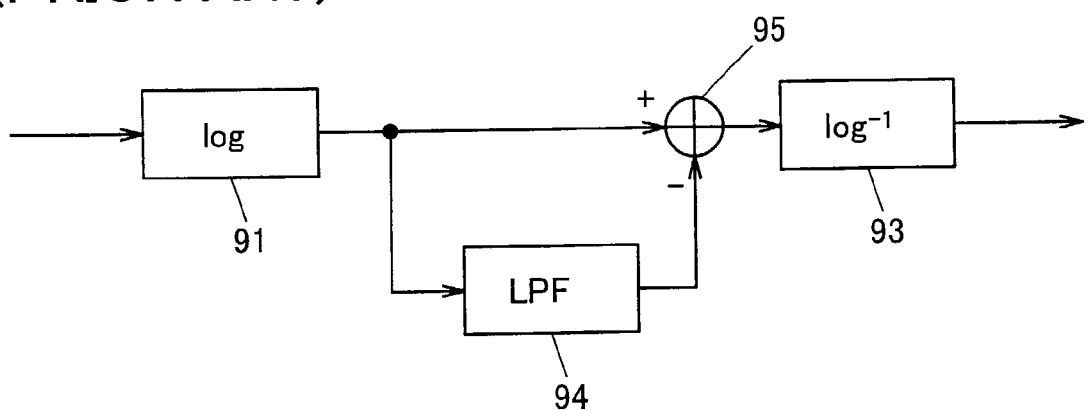

FIG. 1 is a block diagram showing the configuration of an image conversion apparatus 10 according to a first embodiment of the present invention. The image conversion apparatus 10 includes a logarithmic converter 11, a low-frequency-image extractor 12, a delay circuit 16, a first lookup table 13-1, a second lookup table 13-2, and a linear computation unit 14. The low-frequency-image extractor 12 corresponds to the low-frequency-image extraction means; the first lookup table 13-1 and the second lookup table 13-2 correspond to the first and second coefficient determination means, respectively; and the linear computation unit 14 corresponds to the linear computation means. In the present embodiment, the inverse logarithmic conversion 93 shown in FIG. 18 is not used. The image conversion apparatus 10 of the present embodiment is of a high-speed type which performs frequency filtering on a line-by-line basis. Note that in the present embodiment, the constituent elements of the image conversion apparatus 10 are controlled by means of an unillustrated controller.

Figure 2:
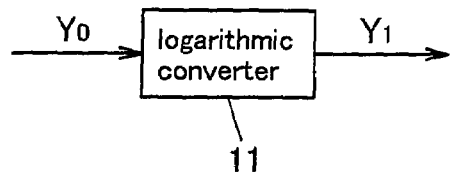
FIG. 2 is a diagram showing action of the logarithmic converter.

Luminance $Y_0$ of each pixel of a captured image is fed to the logarithmic converter 11. From the luminance $Y_0$, the logarithmic converter 11 calculates luminance $Y_1 = (Y_{0max} \log Y_0)/\log Y_{0max}$ and outputs it to the low-frequency-image extractor 12 and the delay circuit 16 (FIG. 2). Here, $Y_{0max}$ represents a maximum value which the luminance $Y_0$ can assume; and through this conversion, $Y_0 = Y_{0max}$ is converted to $Y_1 = Y_{0max}$. The image in which each pixel has luminance $Y_1 =$ will be referred to as a source image. The source image in which each pixel has luminance $Y_1$ is converted on a line-by-line basis as follows.

Figure 3A:
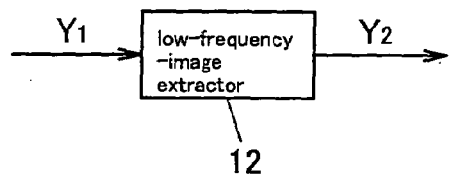
FIGS. 3A and 3B are a diagram and a graph showing action of the low-frequency-image extractor.
Figure 3B:
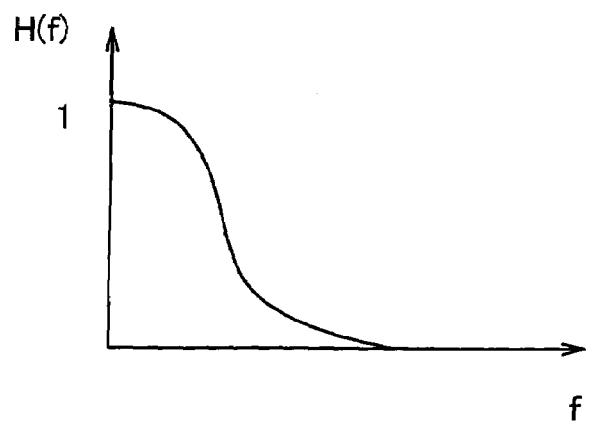

First, the low-frequency-image extractor 12 reads data of the luminance $Y_1$ for one line and extracts therefrom a low frequency image for one line in which each pixel has luminance $Y_2$ (FIG. 3A). In the present embodiment, the extraction of the low frequency image is performed by use of a convolution filter having a frequency characteristic as shown in FIG. 3B. Thus, a low frequency image for one line in which each pixel has luminance $Y_2$ is output from the low-frequency-image extractor 12.

The luminance $Y_2$ of each pixel is successively fed from the low-frequency-image extractor 12 to the first lookup table 13-1 and the second lookup table 13-2. The first lookup table 13-1 and the second lookup table 13-2 store coefficients $C_1$ and $C_2$, respectively, which are represented by the following expressions.

Expression 1:

$$C_1 = \begin{cases} \dfrac{g(T_1 - T_0)}{(g-1)(Y_2 - T_0) + T_1 - T_0} & (Y_2 \le T_1) \\ 1 & (Y_2 \ge T_1) \end{cases}$$

$$C_2 = \begin{cases} \dfrac{g(g-1)(Y_2 - T_0)}{(g-1)(Y_2 - T_0) + T_1 - T_0} & (Y_2 \le T_1) \\ g - 1 & (T_1 \le Y_2 \le T_2) \\ \dfrac{(g-1)T_2}{Y_2} & (Y_2 \ge T_2) \end{cases}$$

Thus, the first lookup table 13-1 outputs to the linear computation unit 14 the coefficient $C_1$ corresponding to the luminance $Y_2$; and the second lookup table 13-2 outputs to the linear computation unit 14 the coefficient $C_2$ corresponding to the luminance $Y_2$. Simultaneously, the luminance $Y_2$ of the corresponding pixel is fed from the low-frequency-image extractor 12 to the linear computation unit 14. The delay circuit 16 delays the input luminance $Y_1$ by a time needed for output of the low frequency image, so that the luminance $Y_1$ of each pixel of the source image corresponding to that of the low frequency image is output to the linear computation unit 14. The linear computation unit 14 calculates luminance $Y_3$ by the expression $Y_3 = C_1 Y_1 + C_2 Y_2$ and outputs the luminance $Y_3$. The converted image in which each pixel has such luminance $Y_3$ has a suppressed low frequency component as compared with the source image in which each pixel has luminance $Y_1$.

Figure 4:
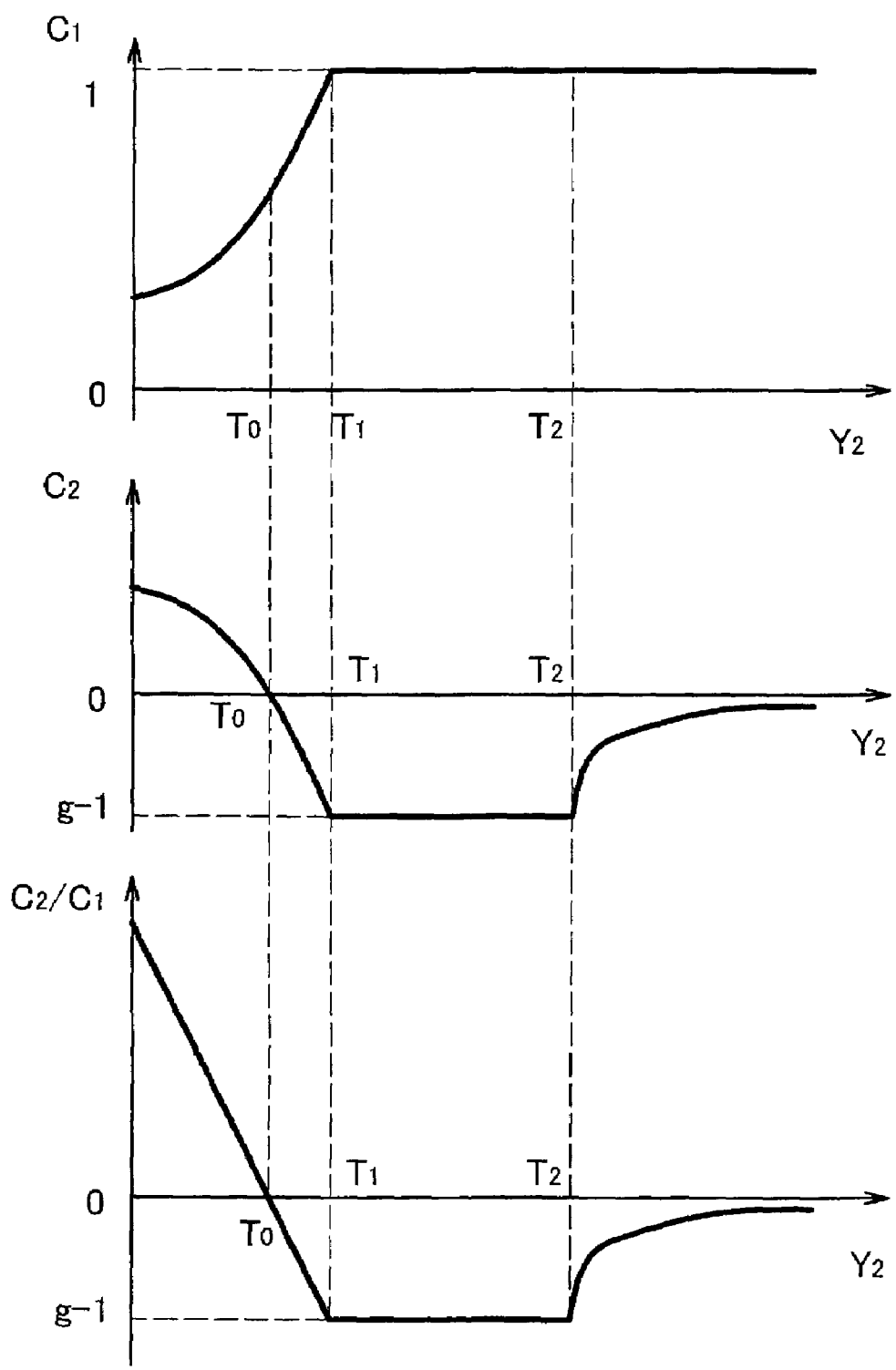
FIG. 4 is a graph showing characteristics of two coefficients which are functions of luminance $Y_2$ of a low frequency image and which are used in linear conversion performed by the image conversion apparatus according to the first embodiment of the present invention.

The characteristics of the converted image in which each pixel has luminance $Y_3$ will be described. FIG. 4 shows graphs for the coefficients $C_1$ and $C_2$ represented by Expression 1 and each being a function of luminance $Y_2$ of the low frequency image, as well as a graph for the quotient $C_2/C_1$. When $Y_2 \leq T_2$, the coefficients $C_1$ and $C_2$ assume respective values such that $C_1+C_2$ assumes a constant value g, where $0<g<1$. Therefore, a decrease in contrast can be prevented in this range. When $Y_2 \leq T_1$, the value of $C_2$ decreases monotonously with increasing luminance $Y_2$, so that the degree of suppression of the low frequency component decreases with the luminance $Y_2$. Therefore, enhancement of noise, which is a high frequency component, can be prevented. Further, since $C_2 \geq 0$ when $Y_2 \leq T_0$, the high frequency component; i.e., noise, is suppressed as compared with the source image. In particular, since the coefficients $C_1$ and $C_2$ are constant ($C_2=g-1$, $C_1=1$) when $T_1 \leq Y_2 \leq T_2$, the low frequency component is suppressed uniformly, so that in an intermediate luminance portion, the dynamic range can be compressed at a constant compression ratio. Further, when $Y_2 \geq T_2$, the coefficient $C_1$ assumes a constant value (1) irrespective of the luminance $Y_2$, and the coefficient $C_2$ assumes a negative value whose absolute value decreases with increasing luminance $Y_2$. Therefore, in this region, the degree of suppression of the low frequency component decreases with increasing luminance $Y_2$. Accordingly, darkening of the low frequency image of high luminance can be mitigated, so that a large white object (or a region thereof, a bright portion) is not grayed.

Figure 5A:
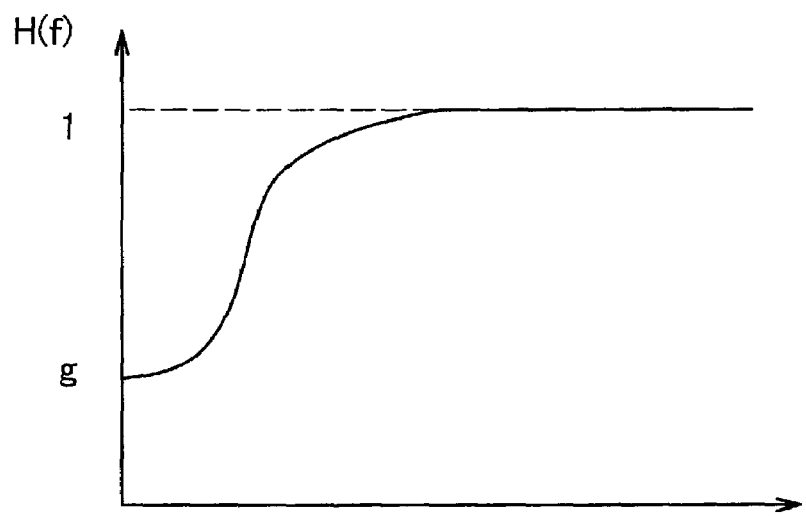
FIGS. 5A and 5B are graphs showing the frequency characteristics of the linear conversion.

The above-described characteristics in relation to image conversion will be referred to as transmission characteristics and will be described further with reference to FIG. 5. In a region in which $C_1$ assumes a constant value of 1 and $C_2$ assumes a constant value of g-1 (where $0<g<1$); i.e., when $Y_2 \leq T_2$, the image conversion apparatus 10 can be said to have a frequency transmission characteristic as shown in FIG. 5A. Specifically, the transmission ratio of the zero spatial frequency component is g, and the transmission ratio increases gradually with frequency to approach 1.

Figure 5B:
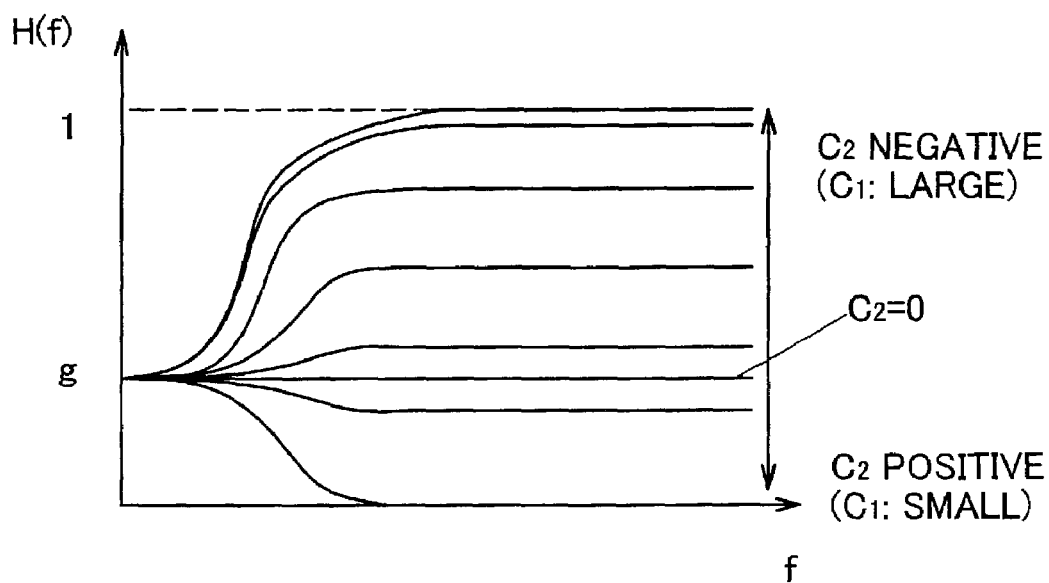

When $C_2$ is changed from positive to zero and then to negative with $C_1+C_2$ maintained at the constant value g such that $C_1$ is changed from a small value to a large value, the transmission characteristic changes as shown in FIG. 5B. That is, when $C_2$ is positive, the high frequency component is suppressed relatively; and when $C_2$ is negative, the low frequency component is suppressed relatively. When $C_1$ assumes the maximum value; i.e., 1, the same characteristic as shown in FIG. 5A is obtained.

As described above, the image conversion apparatus 10 of the present embodiment can suppress noise in low luminance portions and does not gray a large white object (or a region thereof, a bright portion) in a high luminance portion of the image. In an intermediate luminance portion, an image of high contrast can be displayed without generation of a solid black portion or a solid white portion, because the dynamic range is compressed at a constant compression ratio in the intermediate luminance portion. Further, use of lookup tables that can be referred to by use of a single reference value ($Y_2$) reduces the size of memory and increases operation speed. Moreover, since the low frequency component is extracted on a line-by-line basis, operation speed can be increased, and the overall size of the apparatus can be reduced. In the present embodiment, the second lookup table 13-2 may store different values of $C_2Y_2$ corresponding to different values of luminance $Y_2$ and output a value of $C_2Y_2$ with reference to the input value of luminance $Y_2$. In this case, input of luminance $Y_2$ to the linear computation unit 14 may be omitted.

Second Embodiment

Figure 6:
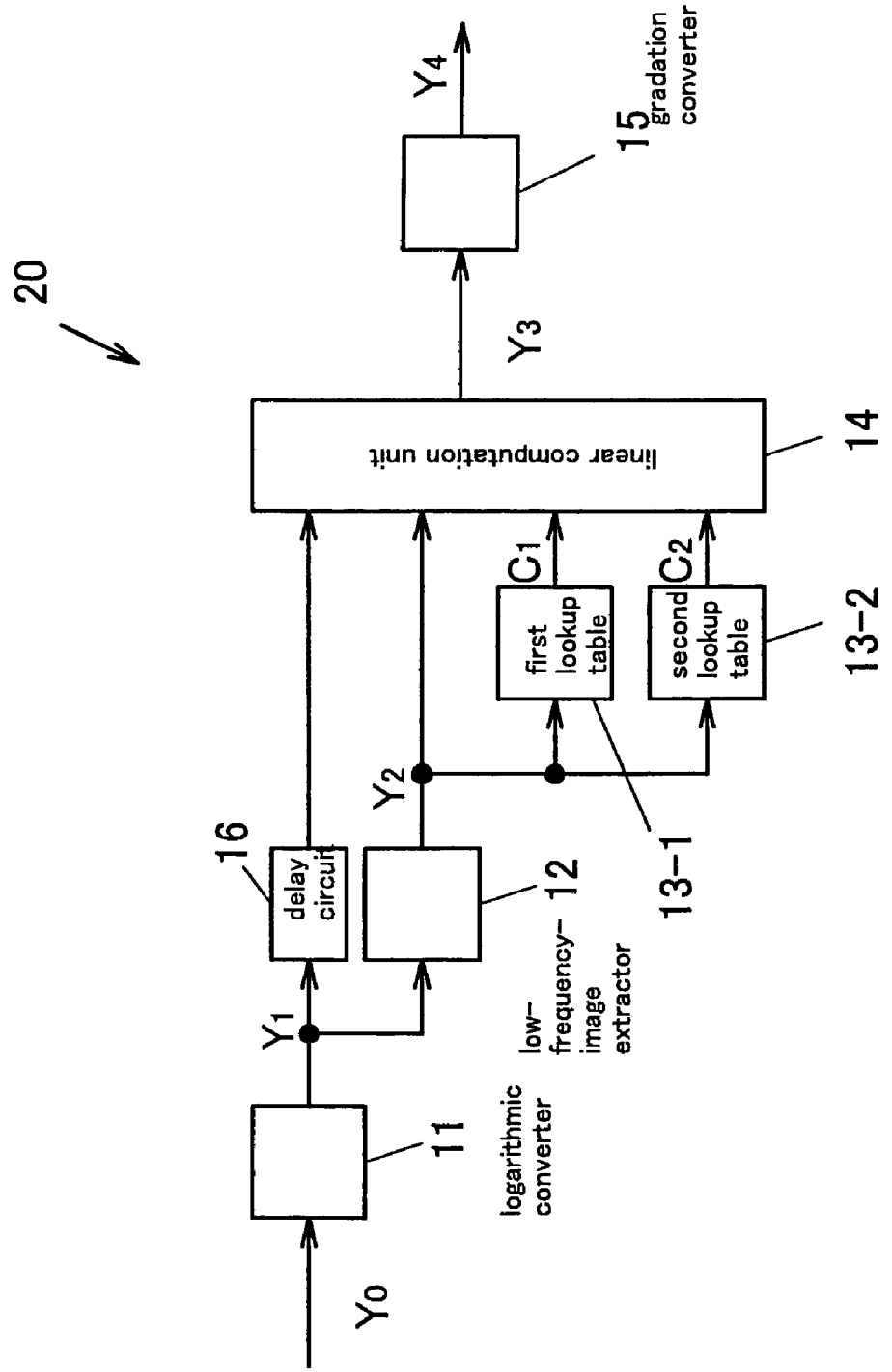
FIG. 6 is a block diagram showing the configuration of an image conversion apparatus according to a second embodiment of the present invention.

FIG. 6 is a block diagram showing the configuration of an image conversion apparatus 20 according to a second embodiment of the present invention. The image conversion apparatus 20 can be obtained by adding a gradation converter 15 to the image conversion apparatus 10 of the first embodiment. The gradation converter 15 performs gray-scale modification processing for luminance $Y_3$ of the converted image, which is the output of the linear computation unit 14, to thereby obtain luminance $Y_4$. The gradation converter 15 may be constituted by a lookup table.

Figure 7:
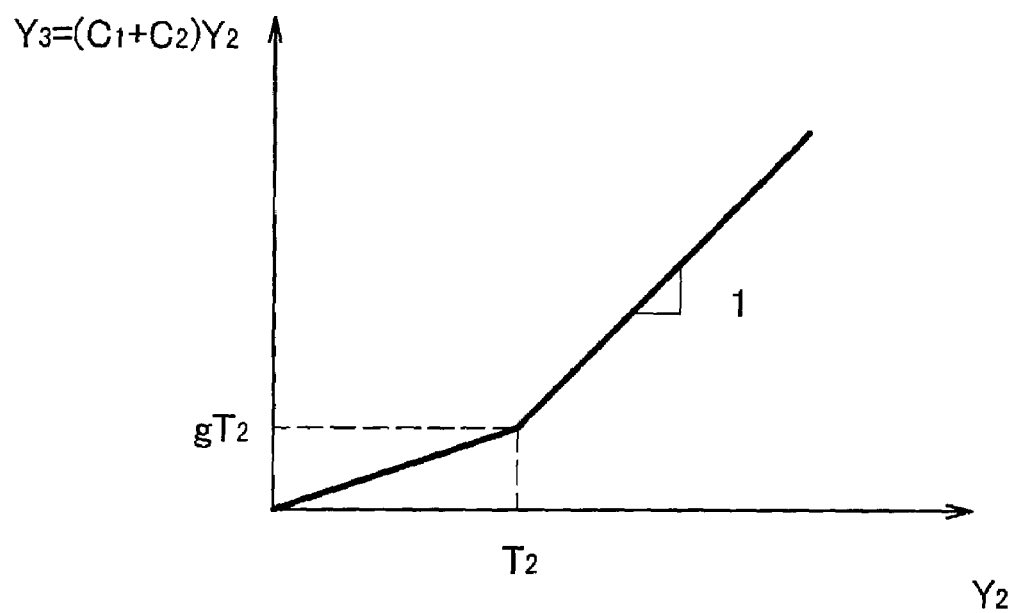
FIG. 7 is a graph showing the characteristics of a converted image input to the gradation converter used in the second embodiment.

The gray-scale modification performed by the gradation converter 15 will be described with reference to FIGS. 7 to 9C. FIG. 7 shows the manner of compression of the dynamic range of the low frequency component of luminance $Y_3$ of the converted image, which is the output of the linear computation unit 14. Specifically, FIG. 7 is a graph showing the relation between luminance $Y_2$ of the low frequency image and luminance $Y_3$ of the converted image. Here, we assume that the source image containing a low frequency component only, and luminance $Y_1$ of the source image is identical with luminance $Y_2$ of the low frequency image. In this case, luminance $Y_3$ of the converted image can be obtained by $(C_1+C_2)Y_2$. FIG. 7 shows the relation between luminance $Y_2$ of the low frequency image and luminance $Y_3$ of the converted image determined under this assumption. The gradient of the graph is g ($0<g<1$) when the luminance $Y_2$ of the low frequency image is less than $T_2$, and is 1 when the luminance $Y_2$ of the low frequency image is not less than $T_2$. Accordingly, when the luminance $Y_2$ of the low frequency image is less than $T_2$, the dynamic range is compressed by a factor of g. This means that the contrast of the low frequency component; i.e., a illumination component, decreases. Since reflection component of an object is a high frequency component, in an ideal case the contrast of the object does not decrease. However, in actuality, the contrast of the reflection component of object decreases slightly, because the image of the object contains a low frequency component as well. In order to solve this problem, gray-scale modification is performed in such a manner that, as shown by a solid line in FIG. 8, when the luminance $Y_3$ of the converted image is not greater than $gT_2$, $Y_4=Y_3/g$. The relation between $Y_4$ and $Y_3$ at that time is represented by $Y_4=F^{-1}(Y_3)$, where $F(Y_2)=(C_1+C_2)Y_2$. In other words, the function is an inverse function of the function for conversion from $Y_2$ to $Y_3$ shown in FIG. 7. This gray-scale modification makes the contrast of the low frequency component in a low luminance portion equal to that in a high luminance portion. In other words, in the low luminance portion, the slightly reduced contrast of a reflection component of the object can be restored.

Figure 8:
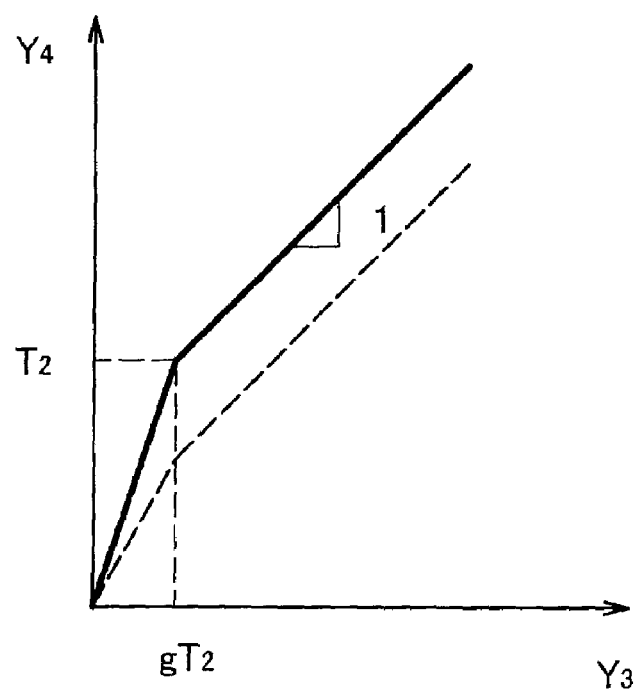
FIG. 8 is a graph showing action of the gradation converter used in the second embodiment.

Moreover, gray-scale modification may be performed in such a manner that, as shown by a broken line in FIG. 8, when the luminance $Y_3$ is not greater than $gT_2$, the gradient becomes smaller than $Y_4=Y_3/g$. The conversion function of this modified gray-scale modification can be represented by the expression $Y_4=\alpha F^{-1}(Y_3)+(1-\alpha)Y_3$, where $\alpha$ is a constant ($0<\alpha<1$). When $\alpha$ is increased, the contrast of an object in a low luminance portion increases, although the compression ratio of the dynamic range decreases. By contrast, when α is decreased, the contrast of an object in a low luminance portion decreases, although the compression ratio of the dynamic range increases.

Figure 9A:
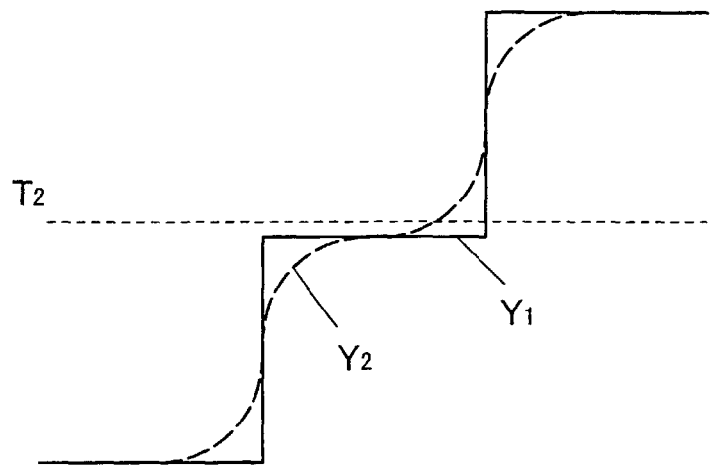
FIGS. 9A to 9C are graphs showing action of the gradation converter used in the second embodiment.
Figure 9B:
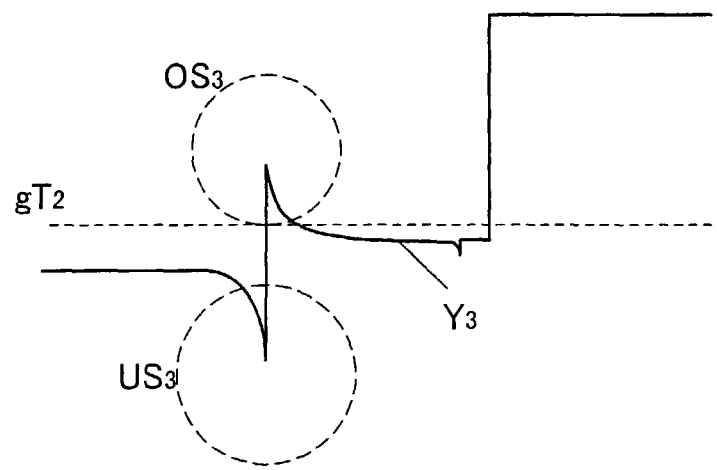
Figure 9C:
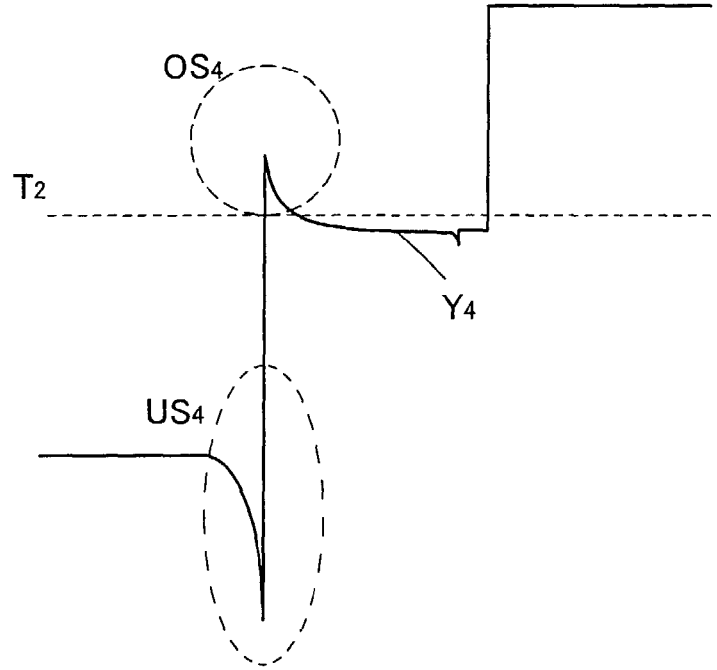
Figure 10:
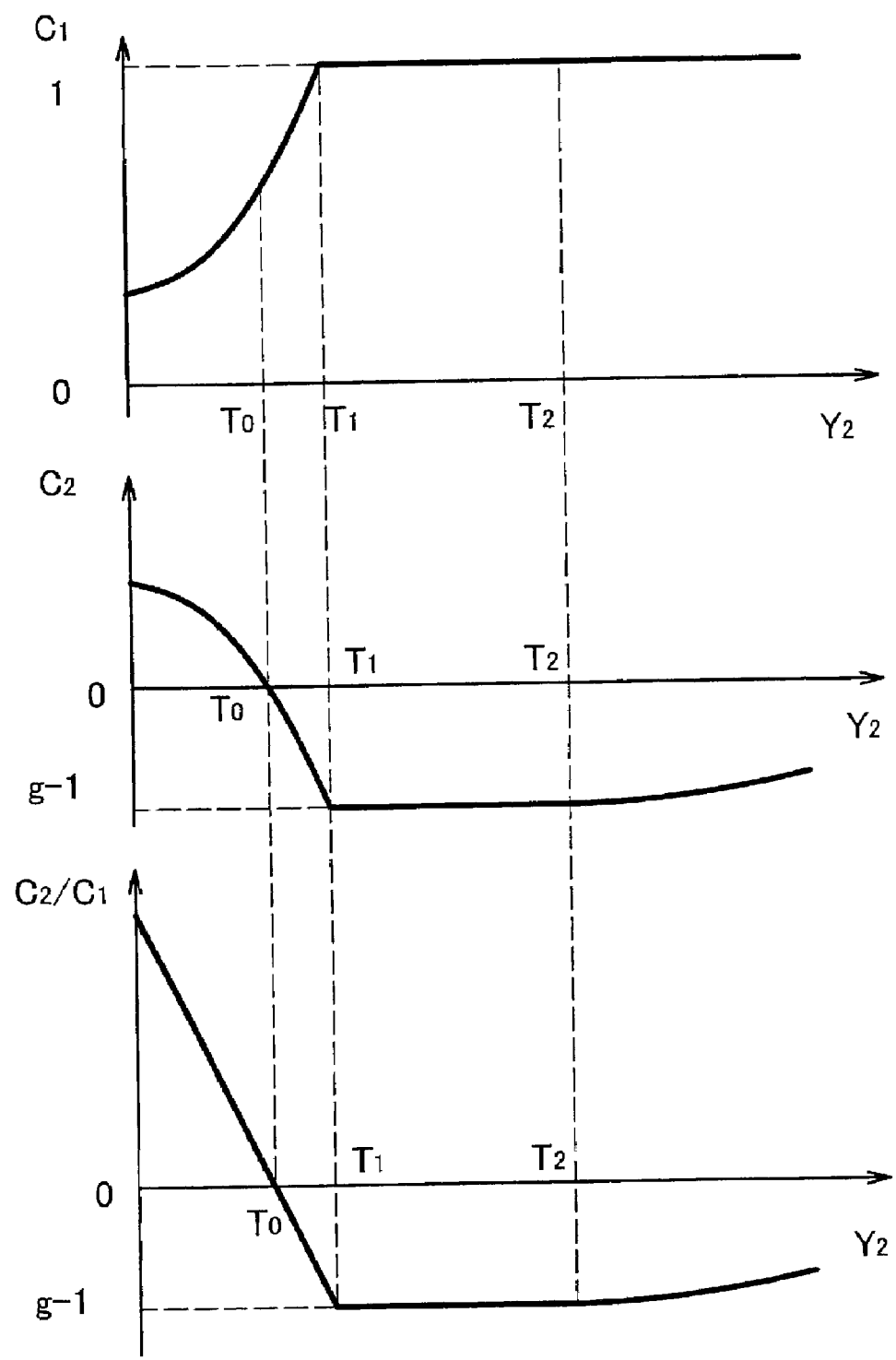
FIG. 10 is a graph showing characteristics of two coefficients which are functions of luminance $Y_2$ of a low frequency image and which are used in linear conversion performed by an image conversion apparatus according to a third embodiment of the present invention.

Gray-scale modification provides the following effect as well. FIG. 9A shows a profile of luminance $Y_1$ of a source image along a single line, along with luminance $Y_2$ of a low frequency image, for the case in which the luminance $Y_1$ of the source image changes stepwise. The horizontal direction represents position along the line, and the vertical direction represents luminance (luminance increases upward in the figure). Here, attention is paid to a portion where the luminances $Y_1$ and $Y_2$ are slightly lower than a threshold value $T_2$. At a step portion on the left end of the portion, the luminance $Y_3$ of the converted image involves an undershoot $US_3$ and an overshoot $OS_3$ in excess of $gT_2$, as shown in FIG. 9B. The overshoot $OS_3$ is grasped as a pseudo contour, because the difference between the overshot portion and the step portion which is located on the left side thereof and whose dynamic range has been compressed is recognized to be relatively large. In order to solve this problem, gradation conversion is performed to generate image luminance $Y_4$ such that the dynamic range is increased on the left side of the overshoot $OS_3$. In this case, the difference between the overshot portion and the step portion becomes relatively small, so that, as shown in FIG. 9C, the overshoot $OS_4$ becomes inconspicuous. Note that empirically, the undershoot $US_4$ does not provide an unnatural impression, because the undershot portion forms a dark portion.

Third Embodiment

The first embodiment can be modified to use the following as the coefficients $C_1$ and $C_2$, each of which is a function of luminance $Y_2$ of the low frequency image.

Expression 2:

$$C_1 = \begin{cases} \dfrac{g(T_1 - T_0)}{(g-1)(Y_2 - T_0) + T_1 - T_0} & (Y_2 \leq T_1) \\ 1 & (Y_2 \geq T_1) \end{cases}$$

$$C_2 = \begin{cases} \dfrac{g(g-1)(Y_2 - T_0)}{(g-1)(Y_2 - T_0) + T_1 - T_0} & (Y_2 \leq T_1) \\ g-1 & (T_1 \leq Y_2 \leq T_2) \\ \dfrac{(1-g)(Y_{2max} - Y_2)^\gamma}{\gamma(Y_{2max} - T_2)^{\gamma-1} Y_2} + \dfrac{(g-1)\{(\gamma-1)T_2 + Y_{2max}\}}{\gamma Y_2} & (Y_2 \geq T_2) \end{cases}$$

In Expression 2, $Y_{2max}$ represents the maximum value that $Y_2$ can assume, and $\gamma$ represents a constant not less than 1. Expression 2 is formulated in such a manner that luminance $Y_3$ is considered to be obtained by the expression $Y_3 = C_1 Y_1 + C_2 Y_2 = C_1(Y_1 + C_2 Y_2/C_1)$ and that the derivative of $C_2 Y_2/C_1$ with respect to $Y_2$ becomes continuous. When $C_1$ is constant, the derivative of $C_2 Y_2/C_1$ with respect to $Y_2$ having had its sign inverted is the dynamic range compression ratio. Therefore, the dynamic range compression ratio for luminance $Y_2$ can be changed continuously. In actuality, the coefficients $C_1$ and $C_2$ are continuous, and the derivative of $C_2 Y_2/C_1$ at $Y_2 = T_2$ assumes the same value of $g-1$ on the left side and right side of that point. The derivative of $C_2 Y_2/C_1$ in a range where $Y_2 \geq T_2$ is as follows.

Expression 3:

$$\frac{d}{dY_2}\left(\frac{C_2}{C_1} Y_2\right) = \frac{(g-1)(Y_{2max} - Y_2)^{\gamma-1}}{(Y_{2max} - T_2)^{\gamma-1}} \quad (Y_2 \geq T_2, \because C_1 = 1)$$

Expression 3 shows that the right-hand derivative of $C_2 Y_2/C_1$ at $Y_2 = T_2$ is $g-1$ and that the dynamic range compression ratio changes smoothly at $Y_2 = T_2$. When the value of $\gamma$ is increased, the dynamic range compression ratio changes more sharply with changes in luminance $Y_2$. When the value of $\gamma$ is 1, $C_2 = g-1$ within a range where $Y_2 \geq T_2$, whereby the dynamic range compression ratio does not change irrespective of changes in luminance $Y_2$. Further, the derivative shown in Expression 3 increases monotonously with increasing luminance $Y_2$; i.e., the dynamic range compression ratio decreases monotonously and becomes zero when $Y_2$ equals $Y_{2max}$. Therefore, the present embodiment can achieve the same effects as those achieved by the first embodiment and can provide a more natural converted image, because the dynamic range compression ratio changes continuously with luminance.

Fourth Embodiment

The first embodiment can be modified to use the following as the coefficients $C_1$ and $C_2$, each of which is a function of luminance $Y_2$ of the low frequency image. Note that $h>1$; the fourth range is $T_1 \leq Y_2 \leq T_2$; the fifth range is $Y_2 \leq T_0$; and the sixth range is $Y_2 \geq T_3$.

Expression 4:

$$C_1 = \begin{cases} 0 & (Y_2 \leq T_0) \\ \dfrac{h(Y_2 - T_0)}{T_1 - T_0} & (T_0 \leq Y_2 \leq T_1) \\ h & (T_1 \leq Y_2 \leq T_2) \\ \dfrac{(1-h)(Y_2 - T_3)}{T_3 - T_2} + 1 & (T_2 \leq Y_2 \leq T_3) \\ 1 & (Y_2 \geq T_3) \end{cases}$$

$$C_2 = 1 - C_1$$

Figure 11:
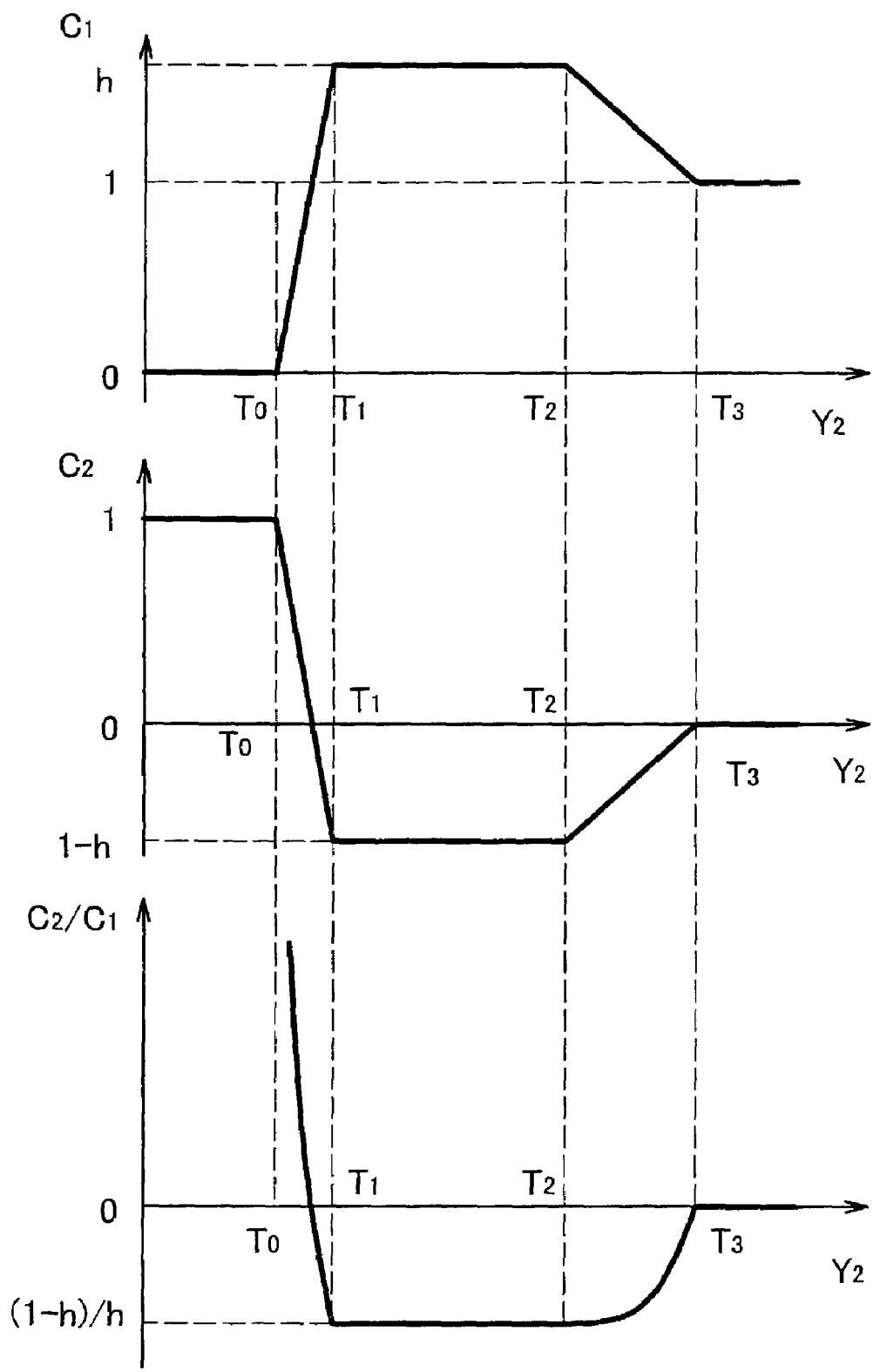
FIG. 11 is a graph showing characteristics of two coefficients which are functions of luminance $Y_2$ of a low frequency image and which are used in linear conversion performed by an image conversion apparatus according to a fourth embodiment of the present invention.

FIG. 11 shows the graph of Expression 4. In the present embodiment, the sum of the coefficients $C_1$ and $C_2$ is constant over the entire range of luminance $Y_2$ of the low frequency image, whereby the contrast of the low frequency component can be prevented from decreasing over the entire range of luminance. Further, the present embodiment achieves the same effects as those achieved by the first embodiment. Since the coefficients $C_1$ and $C_2$ employed in the present embodiment change linearly within each range of luminance $Y_2$, the coefficients $C_1$ and $C_2$ can be calculated by means of linear computation only. When two computation units are provided in place of the lookup tables 13-1 and 13-2 of the first embodiment in order to calculate the coefficients $C_1$ and $C_2$, these coefficients can be calculated at high speed through simple computation.

Fifth Embodiment

The first embodiment can be modified to use the following as the coefficients $C_1$ and $C_2$, each of which is a function of luminance $Y_2$ of the low frequency image. Note that $h>1$.

Expression 5:

$$C_1 + C_2 = 1$$

$$\frac{C_2}{C_1} = \begin{cases} \frac{(1-h)(Y_2 - T_0)}{h(T_1 - T_0)} & (Y_2 \leq T_1) \\ \frac{1-h}{h} & (T_1 \leq Y_2 \leq T_2) \\ \frac{(h-1)(Y_2 - T_3)}{h(T_3 - T_2)} & (T_2 \leq Y_2 \leq T_3) \\ 0 & (Y_2 \geq T_3) \end{cases}$$

Figure 12:
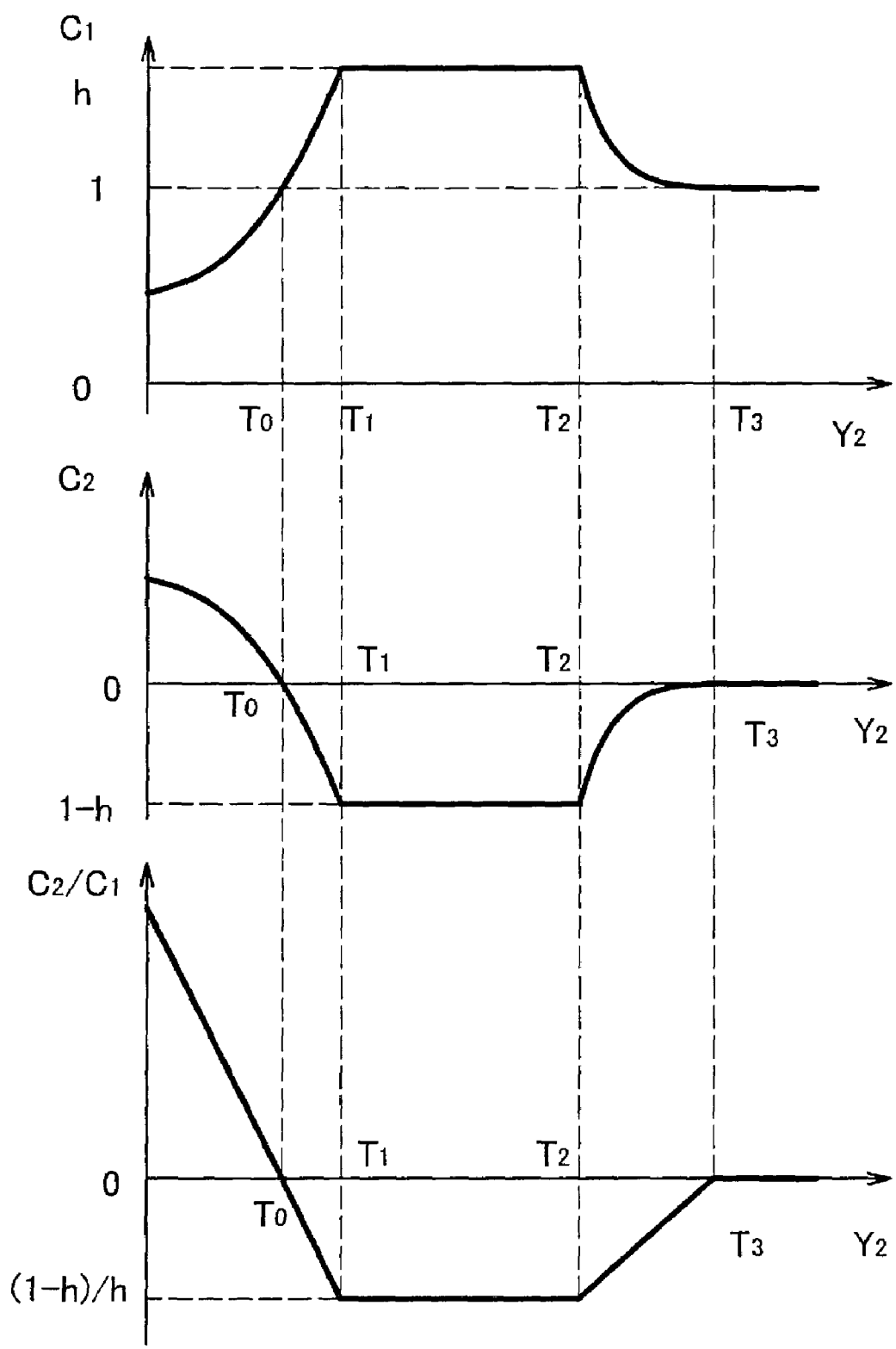
FIG. 12 is a graph showing characteristics of two coefficients which are functions of luminance $Y_2$ of a low frequency image and which are used in linear conversion performed by an image conversion apparatus according to a fifth embodiment of the present invention.

FIG. 12 shows the graph of Expression 5. In the present embodiment, $C_2/C_1$ changes linearly within each range of luminance $Y_2$. The present embodiment achieves the same effects as those achieved by the first embodiment and the fourth embodiment, such as noise suppression in a low luminance portion and prevention of graying of a low frequency component in a high luminance portion.

Sixth Embodiment

Figure 13:
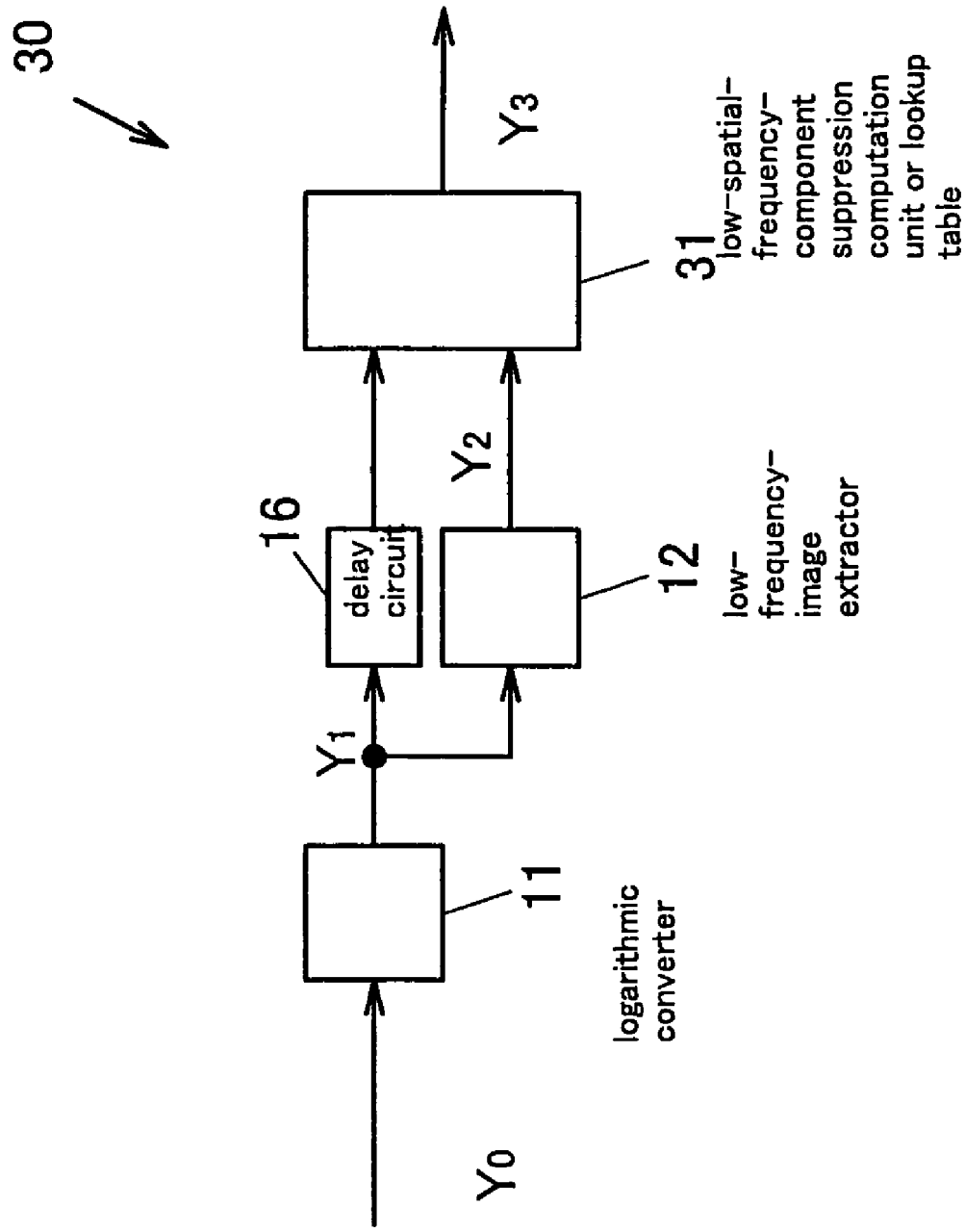
FIG. 13 is a block diagram showing the configuration of an image conversion apparatus according to a sixth embodiment of the present invention.

The first lookup table 13-1, the second lookup table 13-2, and the linear computation unit 14, used in the first, third, and fifth embodiments, may be integrated into a single unit. Further, the gradation converter 15, used in the second embodiment, may be incorporated in the unit. FIG. 13 shows the configuration of an image conversion apparatus 30 according to the present embodiment. The image conversion apparatus 30 includes a logarithmic converter 11, a low-frequency-image extractor 12, a delay circuit 16, and a low-spatial-frequency-component suppression computation unit 31 or a lookup table 31. The low-spatial-frequency-component suppression computation unit 31 has a function of computing the coefficients $C_1$ and $C_2$, and a linear computation function. Further, in order to achieve the same effect as that achieved by the second embodiment, a gray-scale modification function is incorporated into the low-spatial-frequency-component suppression computation unit 31. The lookup table 31 has a memory function for outputting a single value $Y_3$ or $Y_4$ in accordance with two reference values $Y_1$ and $Y_2$.

Seventh, Eighth, and Ninth Embodiments

Figure 14:
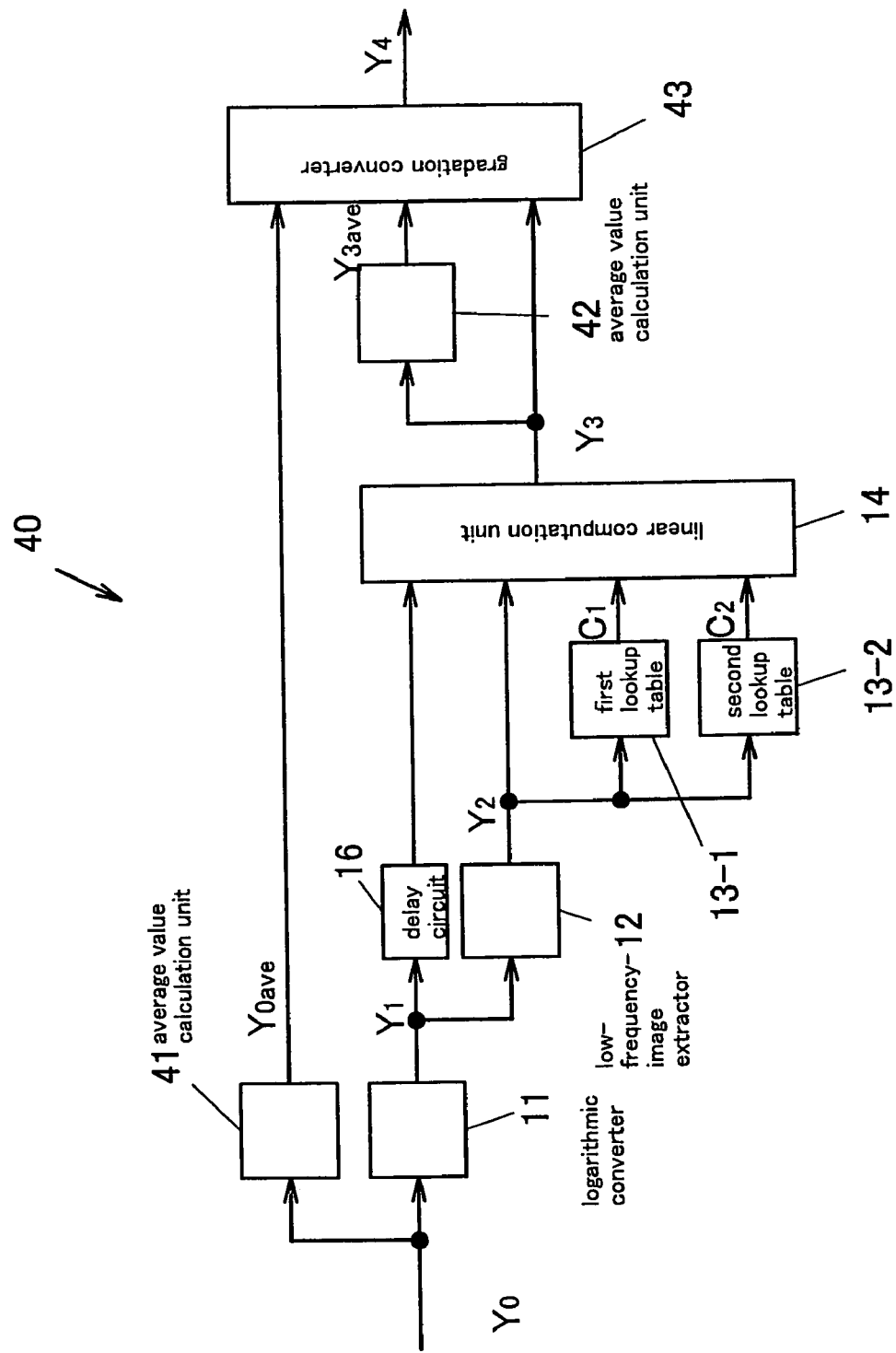
FIG. 14 is a block diagram showing the configuration of an image conversion apparatus according to a seventh embodiment of the present invention.
Figure 15:
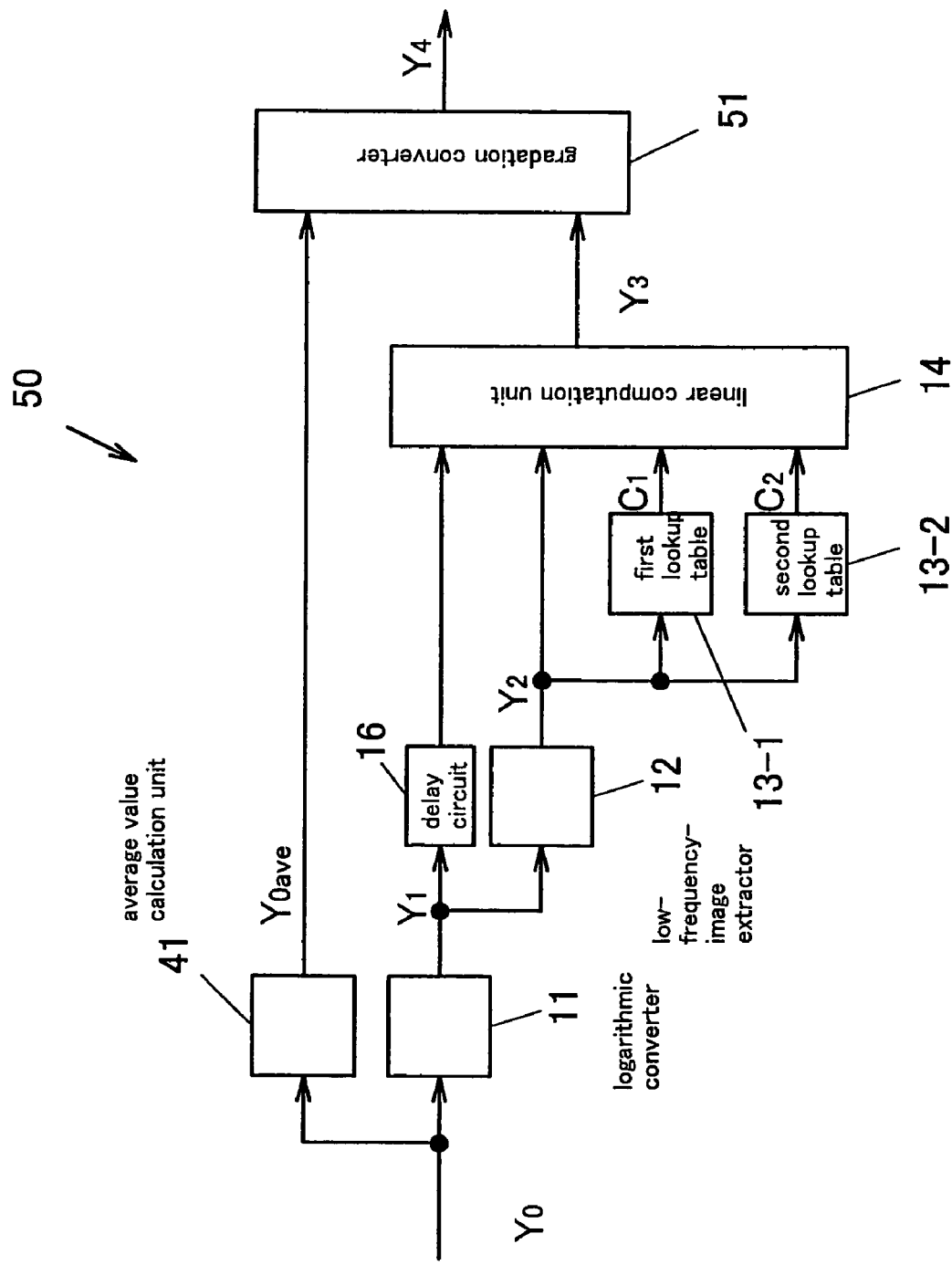
FIG. 15 is a block diagram showing the configuration of an image conversion apparatus according to an eighth embodiment of the present invention.
Figure 16:
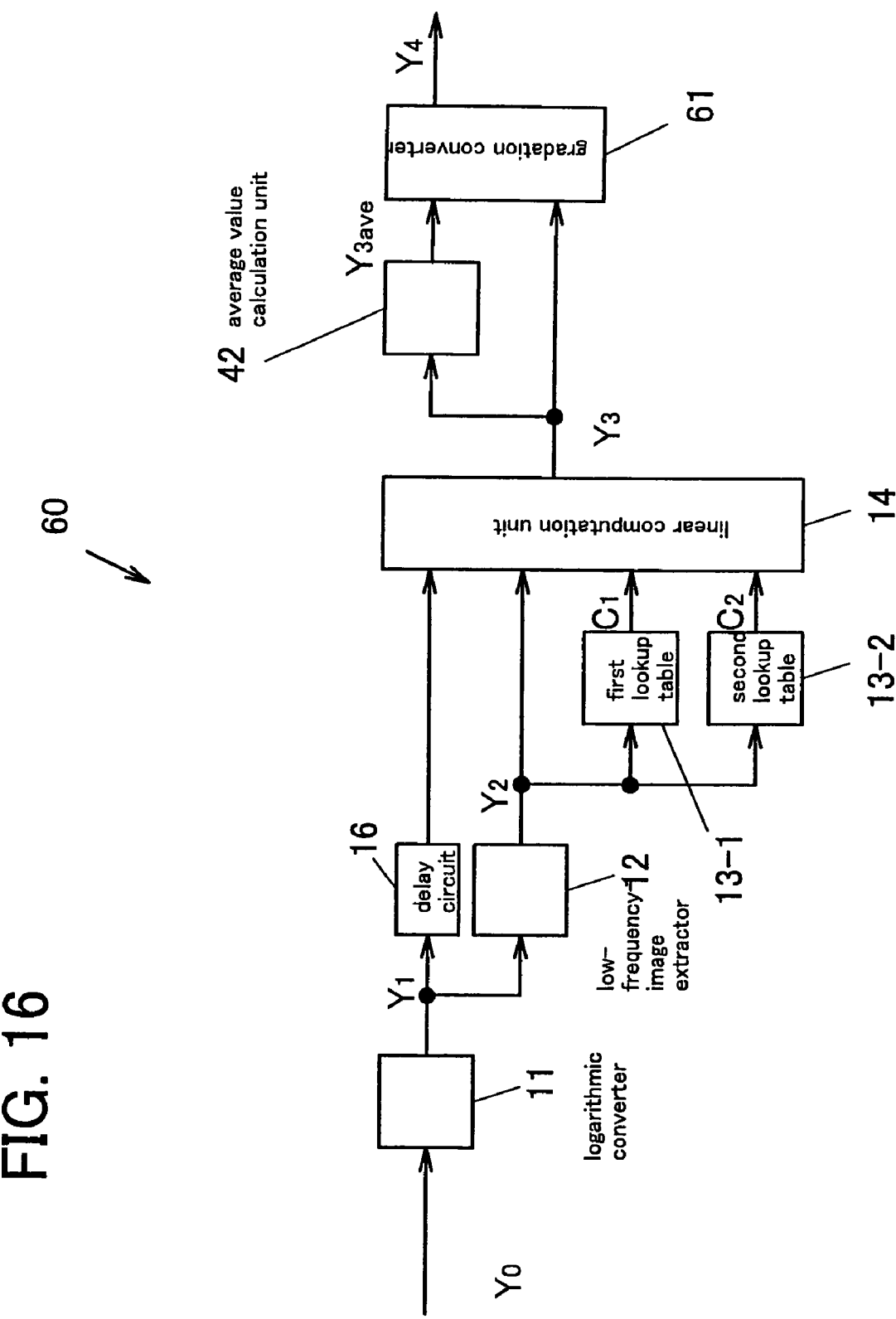
FIG. 16 is a block diagram showing the configuration of an image conversion apparatus according to a ninth embodiment of the present invention.

The gradation converter 15 used in the second embodiment may be modified in such a manner that the degree of conversion is adjusted on the basis of the frame-by-frame average of luminance $Y_3$ of the converted image and luminance $Y_0$ of the captured image before being subjected to logarithmic conversion. FIG. 14 shows an image conversion apparatus 40 according to a seventh embodiment which employs such a configuration. A gradation converter 43 receives not only output $Y_3$ of the linear computation unit 14, but also output $Y_{0ave}$ of an average value calculation unit 41, which calculates the average value of luminance $Y_0$ of the captured image, and output $Y_{3ave}$ of an average value calculation unit 42, which calculates the average value of luminance $Y_3$ of the converted image. This configuration enables the average of luminance $Y_4$ after gradation conversion to be adjusted to a desired level. One of the average value calculation units 41 and 42 may be omitted. FIG. 15 shows an image conversion apparatus 50 according to an eighth embodiment which has a configuration obtained through removal of the average value calculation unit 42 from the image conversion apparatus 40 of the seventh embodiment. FIG. 16 shows an image conversion apparatus 60 according to a ninth embodiment which has a configuration obtained through removal of the average value calculation unit 41 from the image conversion apparatus 40 of the seventh embodiment. A gradation converter 51 of the image conversion apparatus 50 calculates the luminance $Y_4$ after gradation conversion from the output $Y_3$ of the linear computation unit 14 and the output $Y_{0ave}$ of the average value calculation unit 41, which calculates the average value of luminance $Y_0$ of the captured image. A gradation converter 61 of the image conversion apparatus 60 calculates the luminance $Y_4$ after gradation conversion from the output $Y_3$ of the linear computation unit 14 and the output $Y_{3ave}$ of the average value calculation unit 42, which calculates the average value of luminance $Y_3$ of the converted image. In these embodiments, values of the coefficients $C_1$ and $C_2$ may be determined by use of any one of Expressions 1, 2, 4 and 5. In the seventh and eight embodiments, the average value calculation unit 41 calculates the average value $Y_{0ave}$ of luminance $Y_0$ of the captured image before being subjected to logarithmic conversion and outputs the average value to the gradation converter 43 or 51. However, the average value calculation unit 41 may be disposed at a stage following the logarithmic converter 11 and designed to supply the gradation converter 43 or 51 with the average value of luminance $Y_1$ of the source image after being subjected to logarithmic conversion.

Tenth Embodiment

Figure 17:
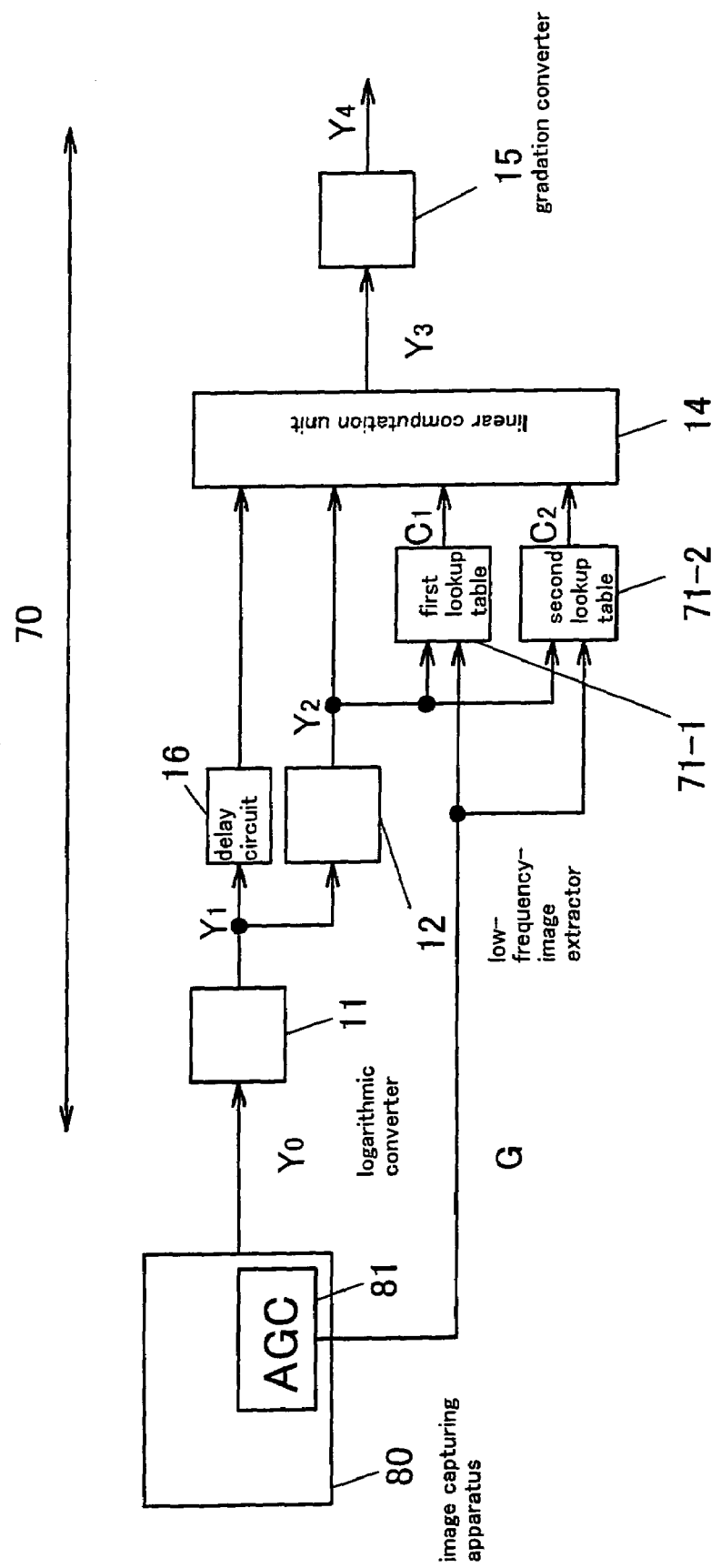
FIG. 17 is a block diagram showing the configuration of an image conversion apparatus according to a tenth embodiment of the present invention.

When the image conversion apparatus according to the first embodiment is to be connected to an image capturing apparatus having an automatic gain controller (AGC), data from the AGC of the image capturing apparatus may be input to the first and second lookup tables of the first embodiment. FIG. 17 shows the configuration of an image conversion apparatus 70 according to a tenth embodiment. The image conversion apparatus 70 to be combined with an image capturing apparatus 80 having an AGC 81 includes first and second lookup tables 71-1 and 71-2 in place of the first and second lookup tables 13-1 and 13-2 of the first embodiment. The first and second lookup tables 71-1 and 71-2 store values of the coefficients $C_1$ and $C_2$ corresponding to values of two reference values; i.e., gain value G output from the AGC 81 and luminance $Y_2$ of a low frequency image, and output the same. Values of the coefficients $C_1$ and $C_2$ may be determined by use of any one of Expressions 1, 2, 4 and 5. The threshold values $T_0$ and $T_1$ used in each expression are changed as follows in accordance with the gain value output from the AGC of the image capturing apparatus 80. The threshold values $T_0$ and $T_1$ determine a range of $Y_2$ in which the degree of suppression of the low frequency component is lowered in order to render noise inconspicuous in a low luminance portion at which the image capturing apparatus has a low S/N ratio. When these threshold values are excessively high, the range of luminance in which contrast of a high frequency component decreases is widened. Accordingly, the threshold values $T_0$ and $T_1$ are desirably set to the lowest possible levels corresponding to the noise level of a captured image. In general, with increasing darkness of an object, the gain value G of the AGC increases, and the noise level of luminance of the captured image increases. By contrast, with increasing brightness of the object, the gain value G of the AGC decreases, and the noise level of luminance of the captured image decreases. Therefore, when threshold values $T_0$ and $T_1$ are changed substantially in proportion to the gain value G of the AGC, noise can be suppressed at a proper luminance level at all times, to thereby prevent insufficiency in noise suppression and production of an converted image in which a dark portion has been blurred excessively.

Eleventh Embodiment

Figure 19:
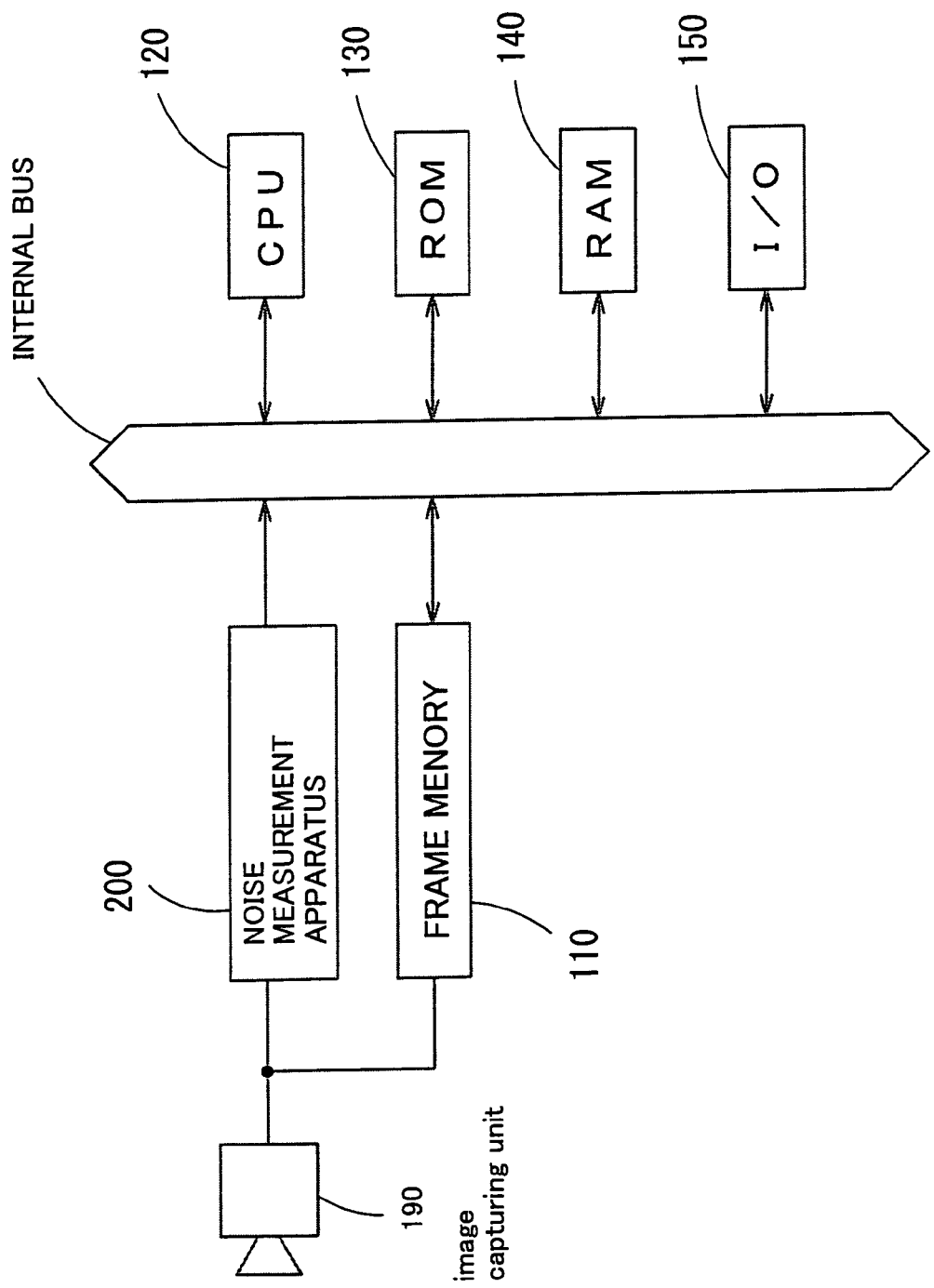
FIG. 19 is a system diagram of an image processing apparatus according to an eleventh embodiment of the present invention.

FIG. 19 is a system diagram showing an image processing apparatus which employs the image noise detection method of the present invention. The image processing apparatus of the present embodiment includes an image capturing unit 190, a noise measurement unit 200, a frame memory unit 110, a CPU 120, ROM 130, RAM 140, and an I/O interface 150. The present embodiment is characterized in that the noise measurement unit 200 capable of accurately detecting noise level is provided at a stage subsequent to the image capturing unit 190.

Figure 20:
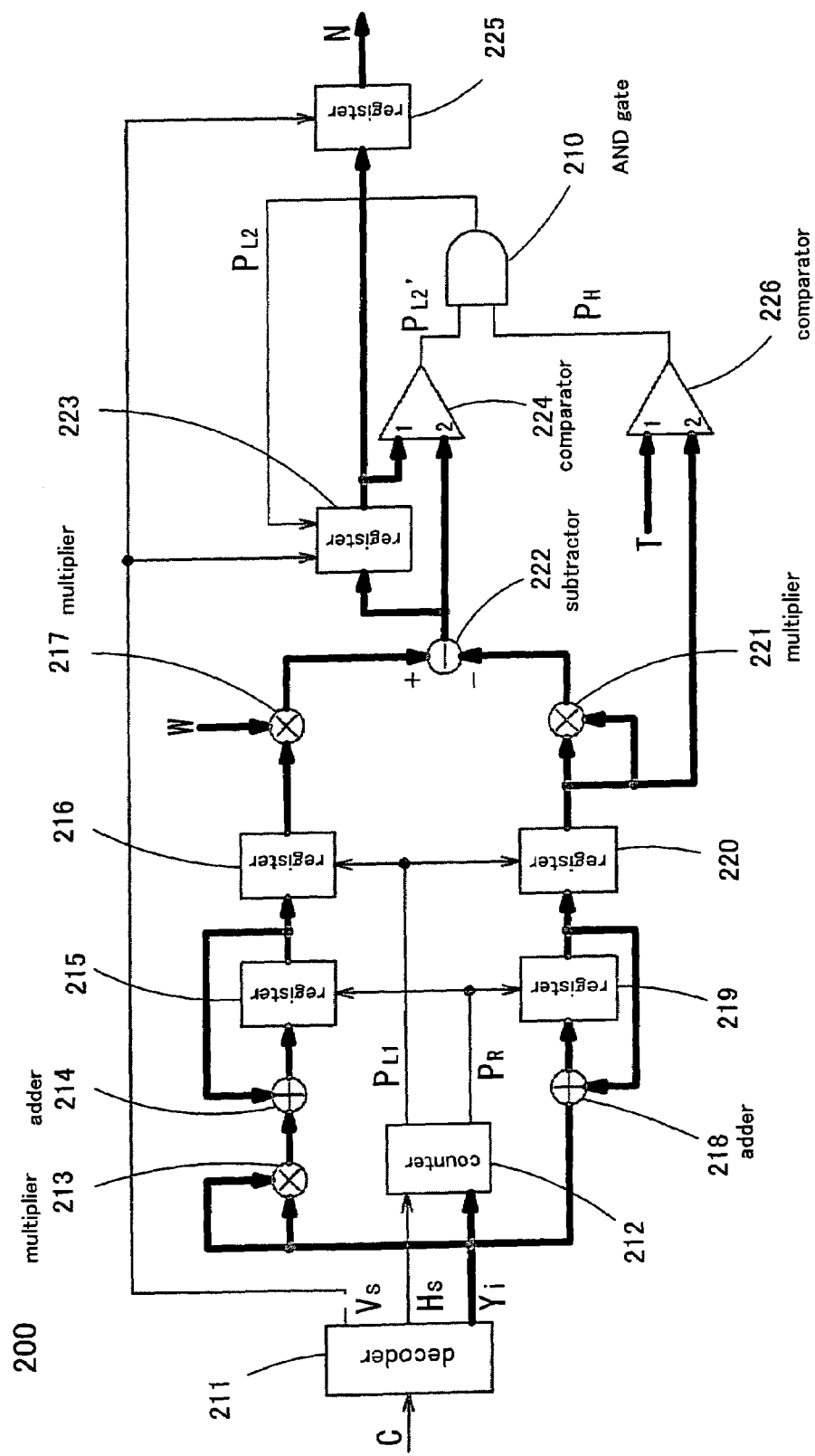
FIG. 20 is a block diagram of a noise measurement unit according to the eleventh embodiment of the present invention.

FIG. 20 is a block diagram showing details of the noise measurement unit 200. The noise measurement unit 200 includes a decoder 211; a counter 212, serving as the local region setting means; a multiplier 213, an adder 214, a register 215, a register 216, a multiplier 217, an adder 218, a register 219, a register 220, a multiplier 221, and a subtractor 222, which constitute the variation detection means; a register 223, a comparator 224, and a register 225, which constitute the noise level determination means; and a comparator 226, which constitutes the saturation judgment means in cooperation with the adder 218, the register 219, and the register 220. Note that in the present specification and the corresponding figures, signal lines indicated by thin lines represent 1 bit control signal lines, while signal lines indicated by thick lines represent bus signal lines.

In the above-described configuration, an input original signal C, which is an analog signal, is input to the decoder 211. The decoder 211 decodes the input analog original signal and successively outputs, in the form of a digital value, luminance value $Y_i$ of each pixel, starting from the pixel at the upper left corner of a image and ending at the pixel at the lower right corner of the image. Also, the decoder 211 outputs a pulse $H_S$ indicating the beginning of each line and a pulse $V_S$ indicating the beginning of each frame.

Figure 23:
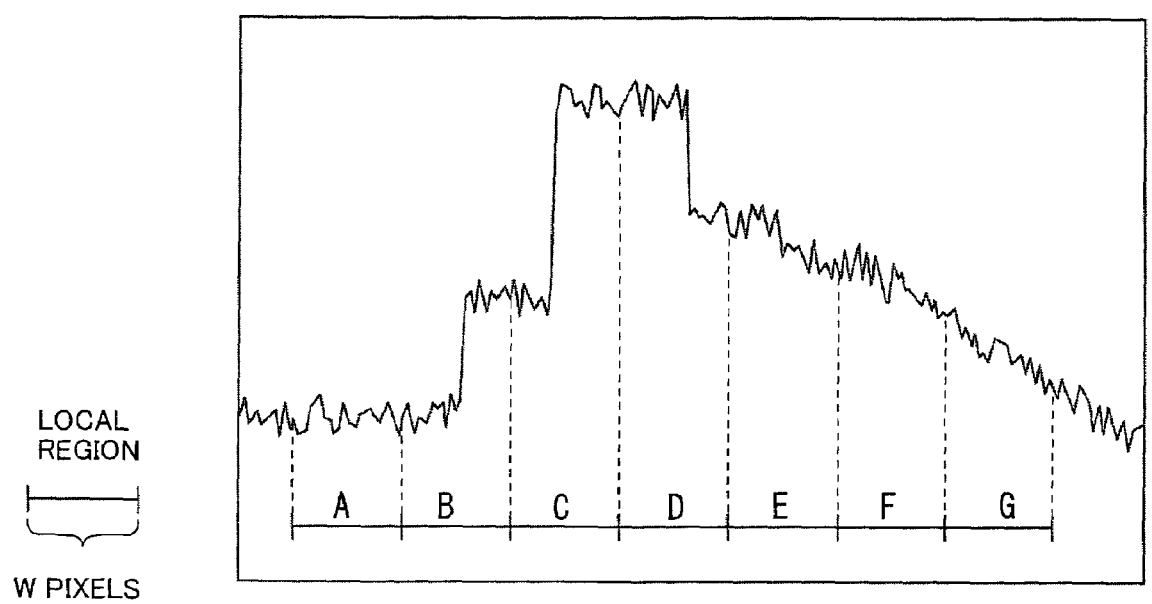
FIG. 23 is an explanatory diagram showing densely set local regions employed in the eleventh embodiment of the present invention.

The luminance value $Y_1$ of each pixel is fed to the counter 212, the multiplier 213, and the adder 218. As will be described later, the counter 212 plays a role of setting a local region having a size of, for example, 1 pixel (vertical direction)×W pixels (horizontal direction). Specifically, for every W pixels, the counter 212 outputs a reset signal $P_R$ and a load signal $P_{L1}$ to thereby update cumulative data ($\Sigma Y_i^2$, $\Sigma Y_i$, i=1 to W), which will be described later. FIG. 23 shows sections of the original signal which correspond to the above-described local regions. Specifically, the local regions correspond to sections A to G, etc., which are densely set on the original signal output from the image capturing unit 190 and containing noise, in such a manner that the sections A to G, etc. do not overlap one another.

In FIG. 20, the luminance value $Y_i$ input to the multiplier 213 is squared by means of the multiplier 213; a resultant value is added to a previous value (the value stored in the register 215) at the adder 214; and a resultant value is stored in the register 215. Output data of the register 215 are stored in the register 216 when the pulse $P_{L1}$ is fed from the counter 212 to the register 216; and the data of the register 215 are reset to zero when the pulse $P_R$ is fed from the counter 212 to the register 215. Accordingly, the register 216 stores the sum of squares of luminance values $Y_1$ within a local region (=$\Sigma Y_i^2$, i=1 to W). The adder 218, the register 219, and the register 220 operate in a similar manner, so that the register 220 stores the sum of luminance values $Y_i$ within a local region (=$\Sigma Y_i$, i=1 to W).

The subtractor 222 subtracts a value $(\Sigma Y_1)^2$ output from the multiplier 212, which squares the sum of luminance values $Y_i$, from a value ($W\Sigma Y_i^2$) output from the multiplier 217, which multiplies the sum of squares of luminance values $Y_i$ by W and outputs a resultant value. The output resultant value is $W^2$ times the variance of luminance within the local regions and serves as a variation coefficient. Note that the counter 212 outputs only the pulse $P_R$ when the pulse $H_S$ is input, whereby when the end of the line is reached in the course of searching a local region, the values of the registers 215 and 219 are not loaded, and the registers 215 and 219 are reset, whereby the local region being searched is invalidated.

Figure 21:
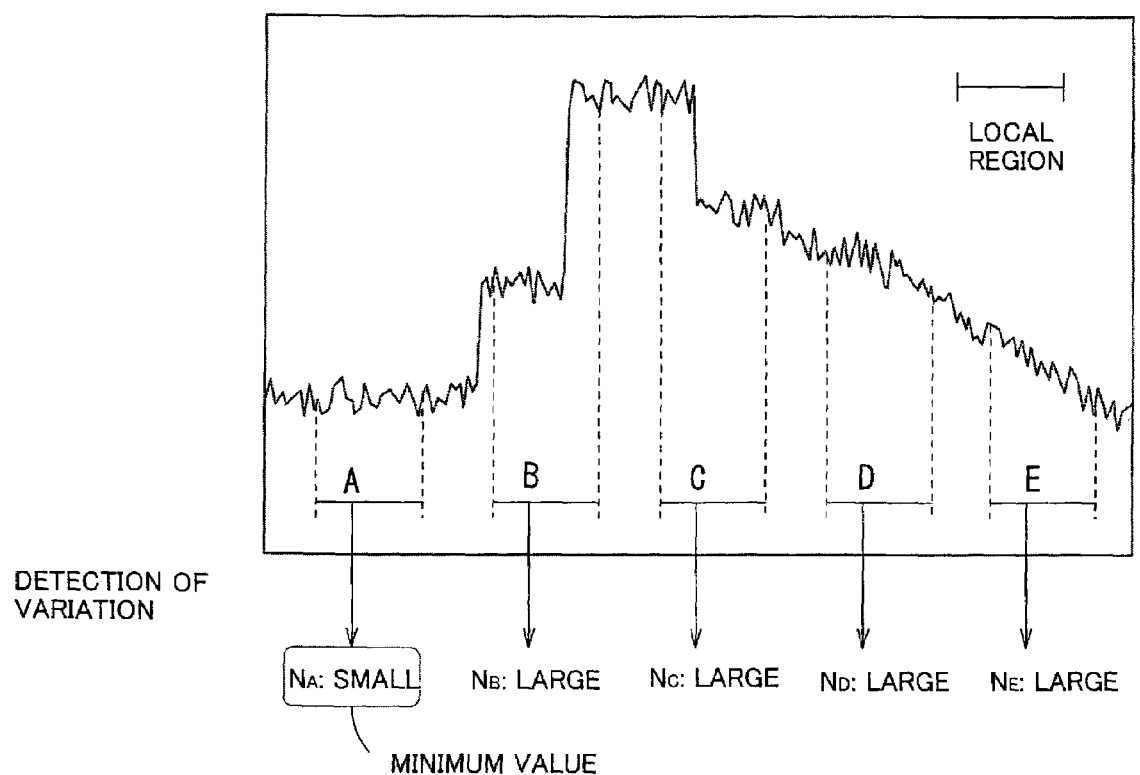
FIG. 21 is an explanatory diagram showing local regions employed in the eleventh embodiment of the present invention.
Figure 22:
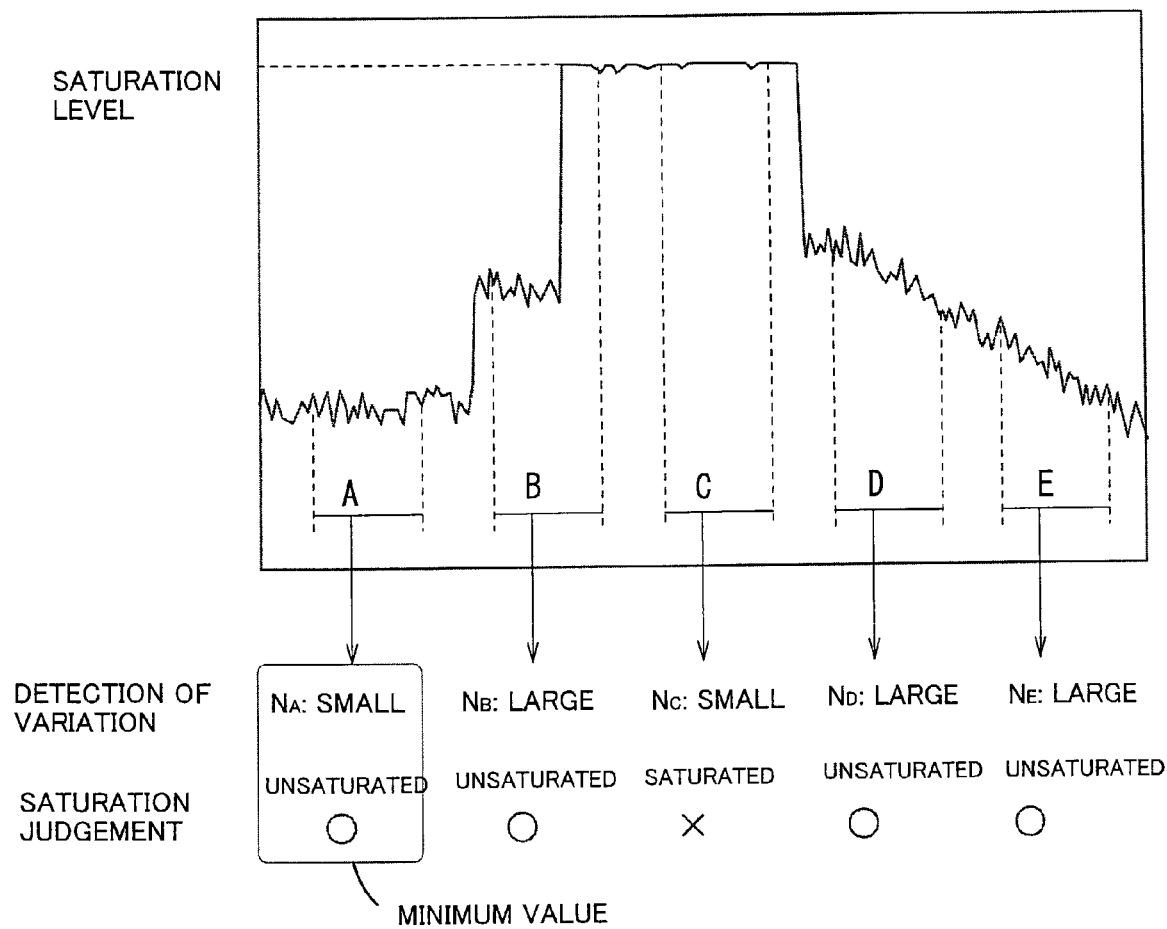
FIG. 22 is an explanatory diagram showing saturation judgement used in the eleventh embodiment of the present invention.

Subsequently, the noise level is determined by the register 223, the comparator 224, and the register 225, which constitute the noise level determination means. Here, the minimum value of the variation coefficient is detected as an index of noise level (FIG. 21). Moreover, judgment is made as to whether or not the present local region is an unsaturated local region. This judgment is performed because when luminance of a local region is saturated, as shown in FIG. 22, noise is buried under the saturation level, and the variation coefficient does not serve as an index that accurately represents the level of noise. Specifically, when the saturation judgment is not performed, in FIG. 22, the variation coefficient $N_C$ at the local region C becomes minimum, but when the saturation judgment is performed, the variation coefficient $N_A$ at the local region A becomes minimum. The saturation judgment is performed as follows. In FIG. 20, the comparator 226 compares the output of the register 220 (=$\Sigma Y_i$, i=1 to W) and a predetermined threshold value T and outputs a (unsaturation) pulse $P_H$ when the output is smaller than the threshold value T. The output of the register 220 is the sum of luminance values of a local region; and the threshold value T is a value obtained by multiplying the luminance saturation level by W or a value slightly less than that value. In other words, the comparator 226 judges whether luminance of a local region is saturated.

The minimum variation coefficient is determined by the register 223, the comparator 224, and an AND gate 210. In response to reception of the pulse $V_S$ (end of a single frame), the value stored in the register 223 is reset to the initial value, which is sufficiently greater than the variation coefficient. Subsequently, candidates of the minimum value of the variation coefficient are output from the subtractor 222 and compared with the value stored in the register 223, by means of the comparator 224. The comparator 224 outputs a pulse $P_{L2}'$ when a candidate minimum value is smaller than the stored value. The AND gate 210 outputs the logical product between the pulse $P_{L2}'$ and the above-described (unsaturation) pulse $P_H$. When both the pulses are at "H" level, the AND gate 210 outputs a load pulse $P_{L2}$ to the register 223. That is, the variation coefficient is stored in the register 223 when the local region is not saturated and the variation coefficient at the present region is the minimum. This operation is performed for all the local regions.

Finally, in response to the signal $V_S$ generated at the beginning of the next frame, the minimum value is stored in the register 225. As a result, the minimum variation coefficient, which serves as an index of noise level, is output as a value N. The CPU 120 detects the variation coefficient N via the internal bus and executes various programs stored in the ROM 130 in accordance with the variation coefficient N. For example, the CPU 120 determines a binarization level for differential images in accordance with the noise level and determines the size of a smoothing filter. The variation coefficient N can be used in various types of image processing.

Twelfth Embodiment

Figure 24:
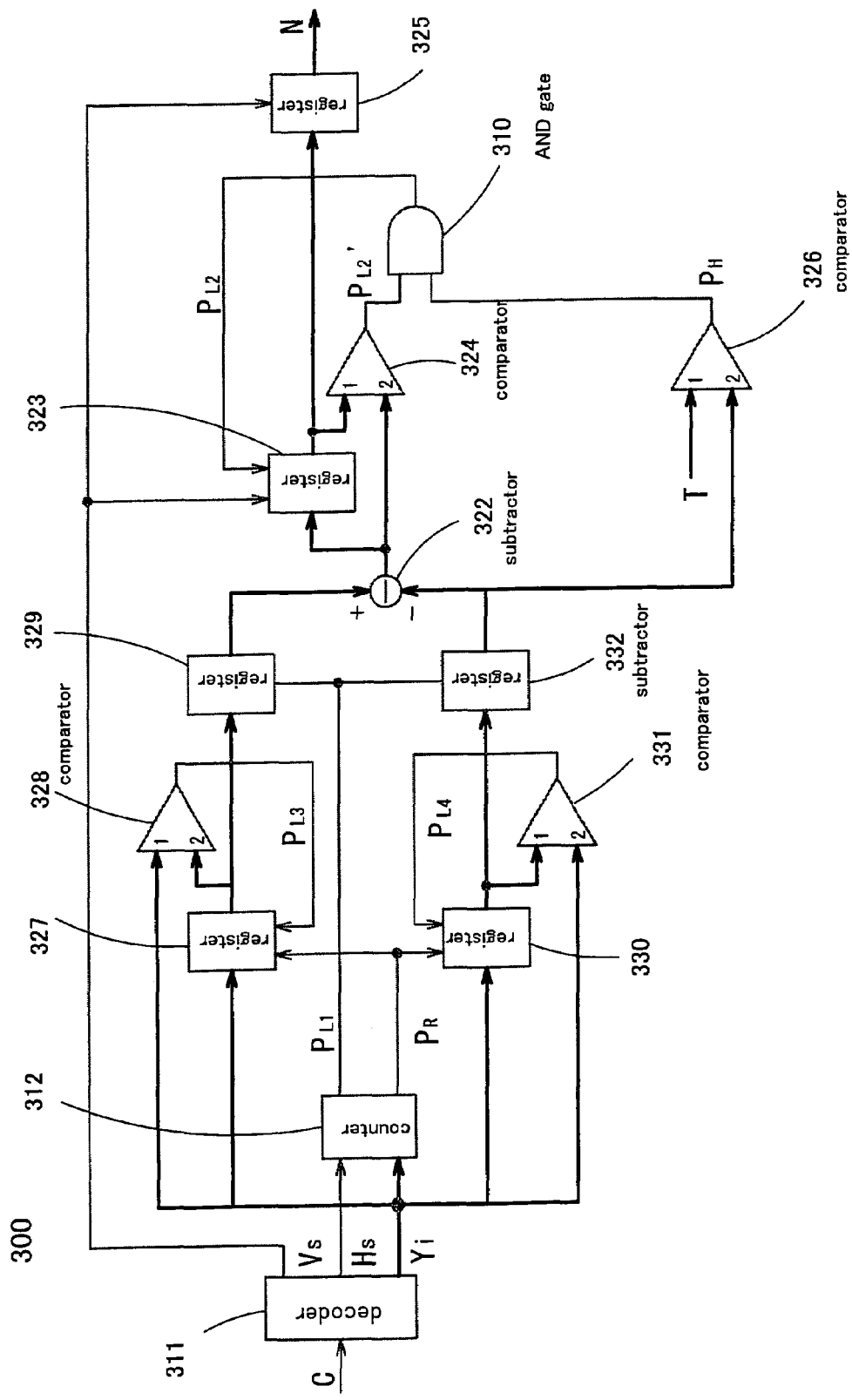
FIG. 24 is a block diagram of a noise measurement apparatus according to a twelfth embodiment of the present invention.

In the eleventh embodiment, a variation coefficient is calculated from a corresponding variance; and presence/absence of saturation is judged on the basis of the sum of luminance values within each local region. Such a variation coefficient may be calculated from a different parameter; and judgment as to saturation may be performed in a different manner. In a twelfth embodiment, the noise level is determined from the difference between the maximum luminance and the minimum luminance in each local region; and presence/absence of saturation is judged on the basis of the minimum luminance in each local region. FIG. 24 is a circuit diagram showing a noise measurement unit 300 according to the twelfth embodiment. The noise measurement unit 300 is similar to the noise measurement unit 200 of the eleventh embodiment (FIG. 20), but the variation detection means and the saturation judgment means are constituted as follows.

The variation detection means of the present embodiment is constituted by a register 327, a comparator 328, a register 329, a register 330, a comparator 331, a register 332, and a subtractor 322. The saturation judgment means of the present embodiment is constituted by the register 330, the comparator 331, the register 332, and a comparator 326. In the present embodiment, the variation coefficient is obtained as follows. First, the comparator 328 compares luminance value $Y_i$ (i=1 to W) and a value stored in the resistor 327. When the luminance value $Y_i$ is greater than the stored value, the comparator 328 outputs a Pulse $P_{L3}$ to the register 327. In response to reception of the Pulse, the register 327 sores the luminance value $Y_i$. That is, a provisional maximum luminance value $Y_{max}$ within a local region is stored in the register 327. Note that when a pulse $P_R$ is fed to the register 327, the value stored in the register 327 is reset to an initial value, which is sufficiently smaller than luminance value Y.

When a pulse $P_{L1}$ is fed to the register 329, the register 329 stores the value stored in the register 327. Therefore, the value stored in the register 329 is the maximum luminance value in the local region. Similarly, the register 330, the comparator 331, and the register 332 detect the minimum luminance value in the local region. The subtractor 322 calculates the difference between the maximum luminance value and the minimum luminance value in the local region and outputs the difference as a variation coefficient. In the present embodiment, the comparator 326, serving as the saturation judgment means, compares the minimum luminance value in the local region detected by the register 330, the comparator 331, and the register 332 with the threshold value T to thereby perform judgment as to presence/absence of saturation.

The variation detection means and the saturation judgment means of the present embodiment do not require computation units such as adders and multipliers. Since these means can be formed by use of registers and comparators only, the structure can be simplified.

Thirteenth Embodiment

Figure 25:
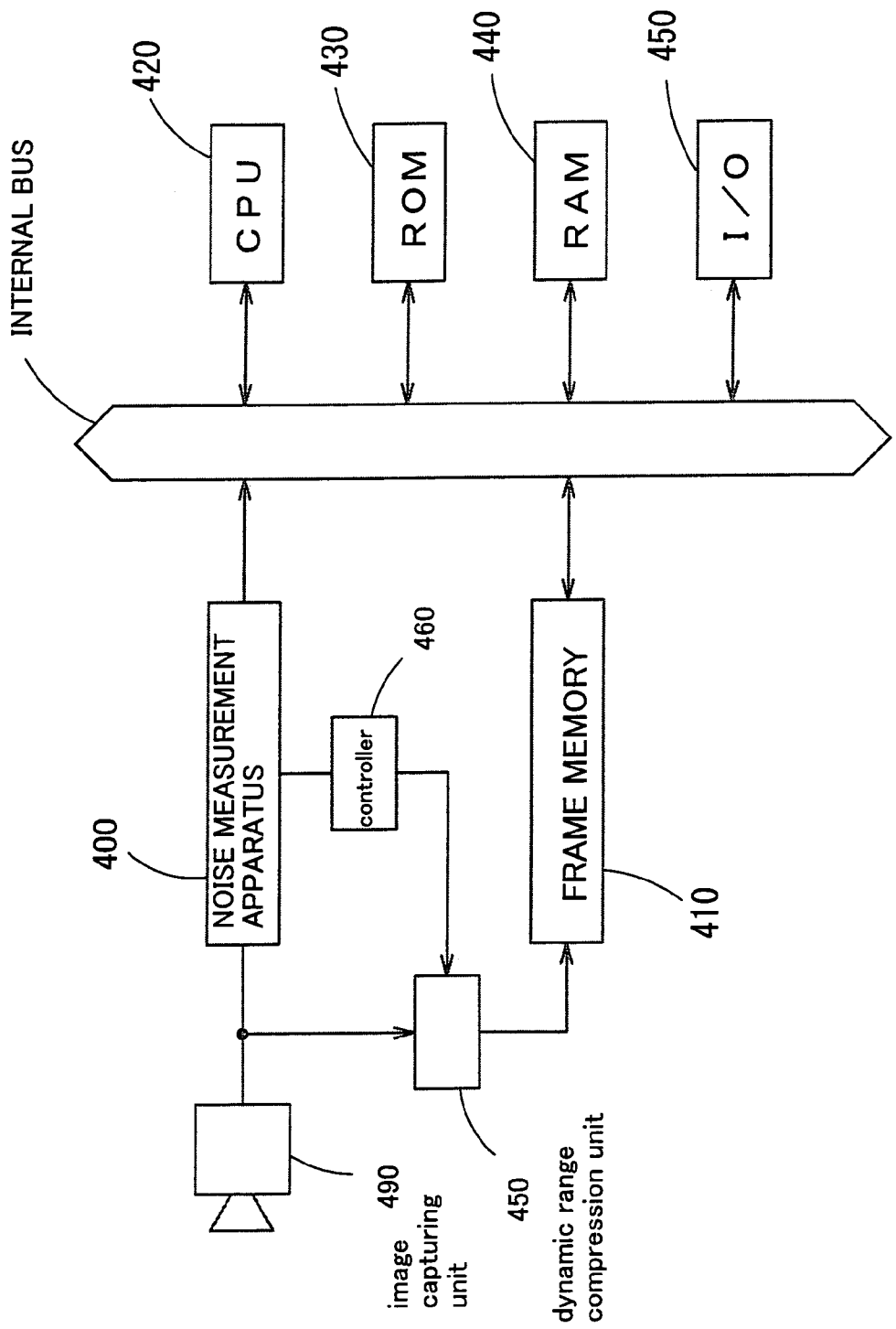
FIG. 25 is a system diagram of an image processing apparatus according to a thirteenth embodiment of the present invention.

FIG. 25 shows an image processing apparatus according to a thirteenth embodiment. The image processing apparatus of the present embodiment includes an image capturing unit 490; a noise measurement unit 400; a dynamic range compression unit 450, serving as the dynamic range compression means; a controller 460, serving as the control means for the dynamic range compression unit 450; a frame memory unit 410; a CPU 420; ROM 430; RAM 440, and an I/O interface 450. As will be described later, the controller 460 includes temporally averaging means to be described later. The feature of the present embodiment resides in that the noise measurement unit 400, the dynamic range compression unit 450, and the controller 460 for controlling the dynamic range compression unit 450 are provided in stages subsequent to the image capturing unit 490. An image processing apparatus having a dynamic range compression function involves a problem in that when the function is applied to an image having a high level noise such as an image captured in the night, its noise component is enhanced. In the present embodiment, the noise level of an original signal is detected by means of the noise measurement unit 400; and the dynamic range compression unit 450 is controlled on the basis of the detection signal (to switch to the original image) to thereby prevent generation of noise. Further, the variation coefficient is detected from a time-average relevant value to thereby enable stable detection of noise level.

Figure 26:
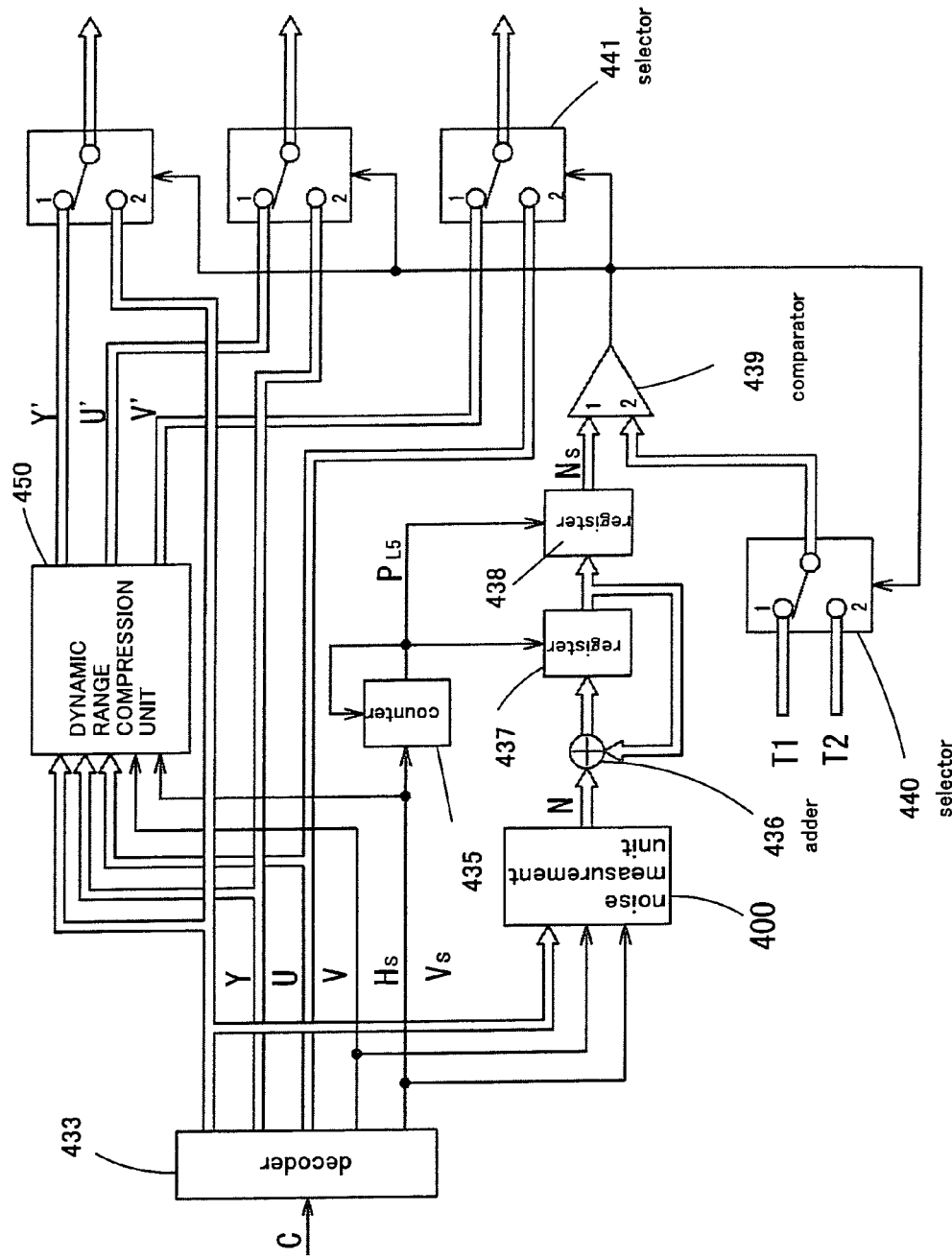
FIG. 26 is a diagram of a control circuit of a dynamic range compression apparatus according to the thirteenth embodiment of the present invention.
Figure 27B:
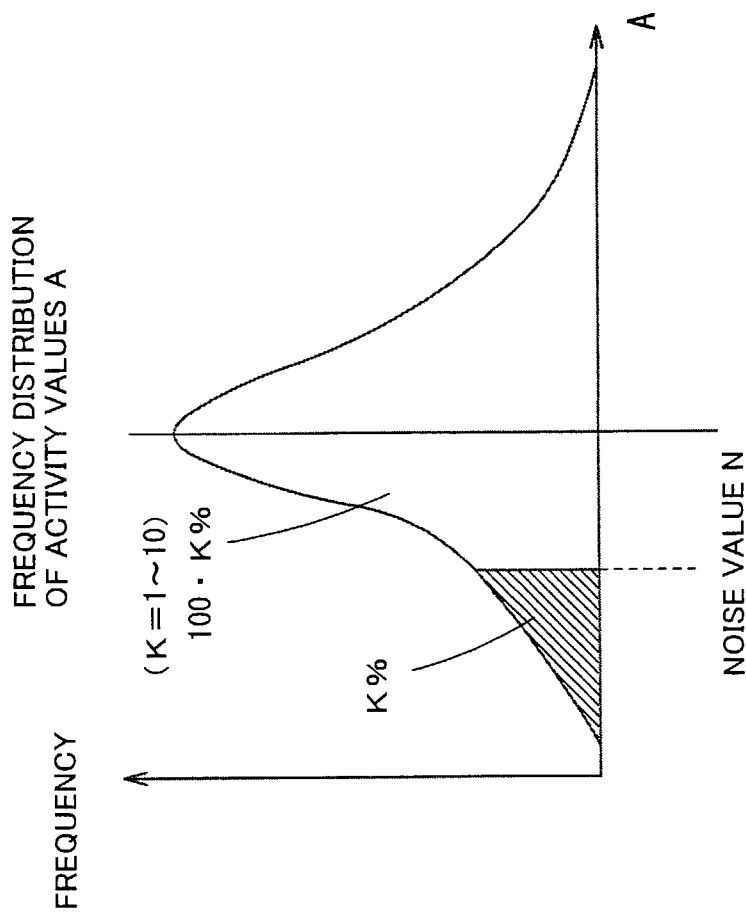
FIG. 27 is an explanatory view showing a conventional image noise measurement method.
Figure 27A:
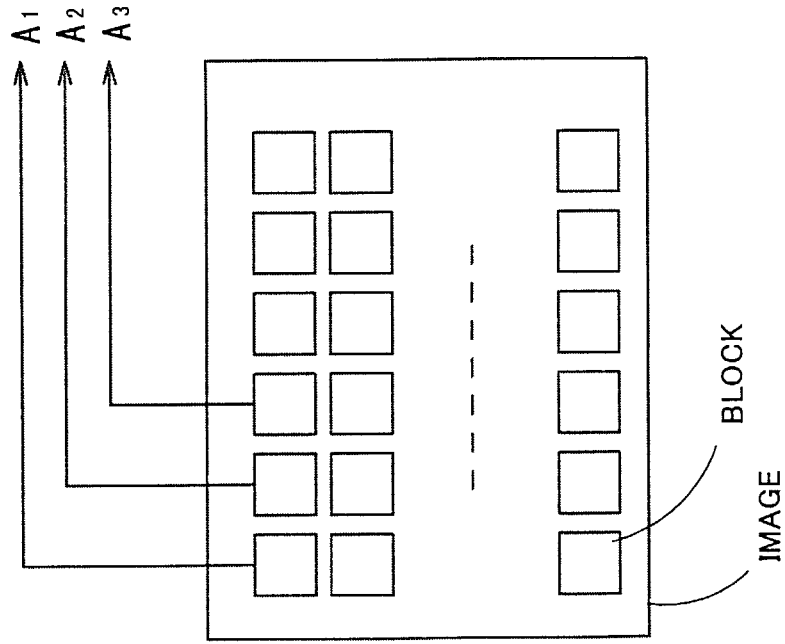
Figure 28:
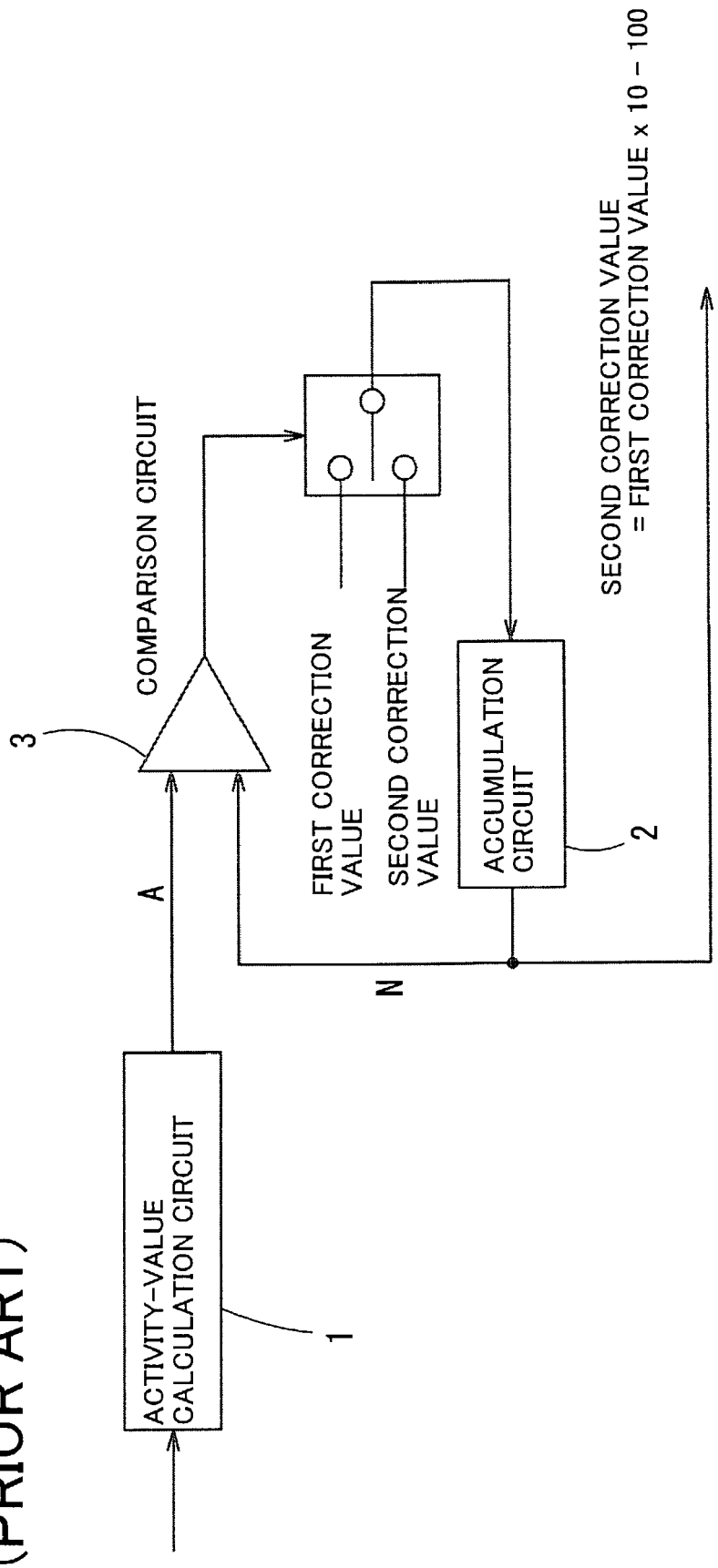
FIG. 28 is a diagram of a conventional image noise measurement circuit.

FIG. 26 shows a circuit diagram of the noise measurement unit 400, the dynamic range compression unit 450, and the controller 460. In FIG. 26, the components other than the noise measurement unit 400, the dynamic range compression unit 450, and the decoder 433 constitute the controller 460. The controller 460 consists of a counter 435, an adder 436, a register 437, a register 438, a comparator 439, and selectors 440 and 441.

In the above-described configuration, an input original signal C, which is an analog signal, is input to the decoder 433. The decoder 433 decodes the input analog original signal and successively outputs, in the form of digital values, luminance value Y and color differences U and V of each pixel, starting from the pixel at the upper left corner of an image and ending at the pixel at the lower right corner of the image. Also, the decoder 433 outputs a pulse $H_S$ indicating the beginning of each line and a pulse $V_S$ indicating the beginning of each frame. The decoded luminance value Y and color differences U and V output from the decoder 433 are fed to the dynamic range compression unit 450, at which the dynamic ranges of the luminance value Y and color differences U and V are compressed in order to obtain a luminance value Y' and color differences U' and V' having compressed dynamic ranges. The dynamic range compression unit 450 can use a method described in the first embodiment to tenth embodiment.

The luminance value Y decoded by means of the decoder 433 is fed to the noise measurement unit 400, so that a variation coefficient N is determined in the same manner as that used in the eleventh embodiment. The counter 435 counts the pulse $V_S$, which represents the beginning of a single frame. When the count value has reached M, the counter 435 outputs a pulse $P_{L5}$ and resets the count value.

The variation coefficient N is fed to the adder 436. The provisional result of the addition is stored in the register 437; and the result of addition calculation performed for M frames is stored in the register 438. That is, even when noise changes with time during the course of the M frames, variation in the variation coefficient N over a short period of time can be reduced, because all the variation coefficients during the M frames are added together. The time length corresponding to M frames will be referred to as a predetermined period of time. The total sum of the variation coefficients N during the predetermined period of time serves as a time-average relevant value. Therefore, the counter 435, the adder 436, and the registers 437 and 438 serve as temporally averaging means.

When the above-described total sum, which serves as a time-average relevant value, is divided by the predetermined period of time, a temporally averaged value is obtained. The division is not necessarily required. In the present embodiment, the total sum is used as is. Use of such a time-average relevant value enables the noise level to be detected stably against changes in time. When the actual temporal average is to be calculated, a divider is provided in a stage subsequent to the register 438 in order to divide the total sum by the predetermined period of time.

Subsequently, the output (noise addition value $N_S$) of the register 438 is fed to the comparator 439. The comparator 439 compares the noise addition value $N_S$ with a threshold value T1 or T2. When the noise addition value $N_S$ is smaller than the threshold value T1 or T2, the comparator 439 outputs a high-level output in order to select terminals 1 of the selector 441; i.e., in order to select the signals output from the dynamic range compression unit 450. By contrast, when the noise addition value $N_S$ is greater than the threshold value T1 or T2, the comparator 439 outputs a low-level output in order to select terminals 2 of the selector 441; i.e., in order to select the signals of the original image. As described above, the level of noise contained in the original image is detected; and when the noise level is high, the dynamic range is not compressed. In other words, for input images containing a high level of noise, such as a scene in the night, the dynamic range compression function is turned off in order to prevent output of an image in which noise has been enhanced and which therefore has deteriorated visibility.

Notably, the selector 440 selects the threshold value T1 when the comparator 439 outputs a high-level signal, and the threshold value T2 when the comparator 439 outputs a low-level signal. The threshold values T1 and T2 are used to turn off and on the dynamic range compression function, respectively, when the threshold value T1 is set smaller than the threshold value T2. The difference (T1−T2) provided between the two threshold values prevents frequent switching between the original image and the image having a compressed dynamic range, which switching would otherwise occur when the noise addition value is close to the threshold values.

Modifications

In the eleventh embodiment, the minimum variation coefficient is detected on a frame-by-frame basis. However, noise can be detected even when the minimum variation coefficient is not detected on a frame-by-frame basis. For example, noise can be detected for every M frames, when the decoder 211 is modified to output a pulse for indicating the beginning of a first frame of every M frames, instead of the above-described pulse $V_S$. Further, noise can be detected for a plurality of lines within a single frame, when the decoder 211 is modified to output a pulse for indicating the beginning of a first line of a line group consisting of a plurality of lines, instead of the above-described pulse $V_S$.

In the eleventh embodiment, the minimum variation coefficient is obtained automatically on a frame-by-frame basis by means of hardware. However, the minimum variation value may be determined by use of a computer unit if processing speed is not important. Specifically, for each local region, the CPU reads the variation coefficient N as shown in the eleventh embodiment, and calculates the minimum value thereof or variation coefficients within the smallest class which falls within a predetermined error range. Alternatively, the CPU may multiply the minimum variation coefficient, or the smallest-class variation coefficients, by a predetermined correction coefficient. This enables more flexible determination of noise level.

In the twelfth embodiment, a variation coefficient of a local region is determined from the difference between the maximum luminance value and the minimum luminance value within the local region; however, the variation coefficient may be determined in a different manner. For example, the average of absolute values of differences between the average luminance value and each luminance value within the local region can be used as a variation coefficient. This can be realized as follows. The CPU directly reads the luminance $Y_1$ and the pulses $P_{L1}$, $P_R$, $P_H$ shown in FIG. 24; selects the values of the luminance $Y_i$ in a section defined by the pluses $P_{L1}$ and $P_H$ and corresponding to an unsaturated local region; and obtains differences between the average luminance value and each luminance value on the basis of the luminance values.

The eleventh embodiment shows an example in which presence/absence of saturation is judged on the basis of the sum of luminance values within each local region; and the twelfth embodiment shows an example in which presence/absence of saturation is judged on the basis of the minimum value of luminance within each local region. However, judgment as to saturation may be performed in a different manner. For example, it is possible to count the number of saturated pixels within each-local-region and judge whether saturation occurs on the basis of the counted number.

Obviously, numerous modifications and variations of the present invention are possible in light of the above teachings. It is therefore to be understood that within the scope of the appended claims, the present invention may be practiced otherwise than as specifically described herein.

What is claimed is:

1. An image conversion method of processing a source image in which each pixel has a luminance value, in order to compress the dynamic range of the image in terms of brightness, the method comprising:

a low-frequency-image extraction step of extracting a low frequency image consisting of a low frequency component of the source image in terms of variation in luminance;

a coefficient determination step of obtaining two coefficients $C_1$ and $C_2$ from luminance $Y_2$ of each pixel of the low frequency image corresponding to luminance $Y_1$ of a corresponding pixel of the source image; and a linear computation step of obtaining luminance $Y_3$ of a corresponding pixel of a converted image by use of an expression $Y_3 = C_1 Y_1 + C_2 Y_2$ and from the two coefficients $C_1$ and $C_2$, the luminance $Y_1$ of the corresponding pixel of the source image, and the luminance $Y_2$ of the pixel of the low frequency image, wherein each of the coefficients $C_1$ and $C_2$ is a continuous function of luminance $Y_2$ of a relevant pixel of the low frequency image;

the coefficient $C_1$ is positive or zero; and the coefficient $C_2$ is a monotonic decreasing function in a broad sense, in a continuous first range where the luminance $Y_2$ assumes a minimum value, such that the coefficient $C_2$ assumes a positive value, becomes zero, and then assumes a negative value, and is a monotonic increasing function in a broad sense, in a continuous second range where the luminance $Y_2$ assumes a maximum value, such that the coefficient $C_2$ assumes a negative value or zero.

2. An image conversion method according to claim 1, wherein the sum of the two coefficients $C_1$ and $C_2$ assumes a constant positive value at least within a continuous third range within the entire range of the luminance $Y_2$.

3. An image conversion method according to claim 2, wherein the sum of the two coefficients $C_1$ and $C_2$ is constant over the entire range of the luminance $Y_2$.

4. An image conversion method according to claim 2, wherein within a continuous fourth range within the third range of the luminance $Y_2$, the coefficient $C_1$ assumes a constant positive value, and the coefficient $C_2$ assumes a constant negative value.

5. An image conversion method according to claim 3, wherein within a continuous fourth range within the third range of the luminance $Y_2$, the coefficient $C_1$ assumes a constant positive value, and the coefficient $C_2$ assumes a constant negative value.

6. An image conversion method according to claim 1, wherein $C_2/C_1$ is a monotonic decreasing function of the luminance $Y_2$ in a broad sense in the first range of the luminance $Y_2$ and is a monotonic increasing function of the luminance $Y_2$ in a broad sense in the second range of the luminance $Y_2$.

7. An image conversion method according to claim 2, wherein $C_2/C_1$ is a monotonic decreasing function of the luminance $Y_2$ in a broad sense in the first range of the luminance $Y_2$ and is a monotonic increasing function of the luminance $Y_2$ in a broad sense in the second range of the luminance $Y_2$.

8. An image conversion method according to claim 5, wherein $C_2/C_1$ is a monotonic decreasing function of the luminance $Y_2$ in a broad sense in the first range of the luminance $Y_2$ and is a monotonic increasing function of the luminance $Y_2$ in a broad sense in the second range of the luminance $Y_2$.

9. An image conversion method according to claim 4, wherein the coefficient $C_1$ assumes a constant positive value in a range which includes the entire fourth range of the luminance $Y_2$ and covers a greater range than the fourth range.

10. An image conversion method according to claim 3, wherein $C_1$ is zero in a continuous fifth range where the luminance $Y_2$ assumes the minimum value; $C_2$ is zero in a continuous sixth range where the luminance $Y_2$ assumes the maximum value; and $C_1$ is a constant positive value and $C_2$ is a constant negative value within at least a continuous portion between the fifth and sixth ranges.

11. An image conversion method according to claim 1, wherein extraction of the low frequency image is performed based on one dimension frequency analysis along each pixel line.

12. An image conversion apparatus for processing a source image in which each pixel has a luminance value in order to compress the dynamic range of the image in terms of brightness, the apparatus comprising:

low-frequency-image extraction means for extracting a low frequency image consisting of a low frequency component of the source image in terms of variation in luminance;

first and second coefficient determination means for obtaining two coefficients $C_1$ and $C_2$, respectively, from luminance $Y_2$ of each pixel of the low frequency image output from the low-frequency-image extraction means;

linear computation means for obtaining luminance $Y_3$ of a corresponding pixel of a converted image by use of an expression $Y_3=C_1Y_i+C_2Y_2$ and from the two coefficients $C_1$ and $C_2$ obtained by the first and second coefficient determination means, the luminance $Y_2$ of the pixel of the low frequency image output from the low-frequency-image extraction means, the luminance $Y_2$ having been used for determination of the coefficients $C_1$ and $C_2$, and luminance $Y_1$ of a corresponding pixel of the source image, wherein each of the coefficients $C_1$ and $C_2$ is a continuous function of luminance $Y_2$ of a relevant pixel of the low frequency image;

the coefficient $C_1$ is positive or zero; and the coefficient $C_2$ is a monotonic decreasing function in a broad sense, in a continuous first range where the luminance $Y_2$ assumes a minimum value, such that the coefficient $C_2$ assumes a positive value, becomes zero, and then assumes a negative value, and is a monotonic increasing function in a broad sense, in a continuous second range where the luminance $Y_2$ assumes a maximum value, such that the coefficient $C_2$ assumes a negative value or zero.

13. An image conversion apparatus according to claim 12, wherein the sum of the coefficients $C_1$ and $C_2$ assumes a constant positive value at least within a continuous third range within the entire range of the luminance $Y_2$.

14. An image conversion apparatus according to claim 13, wherein the sum of the coefficients $C_1$ and $C_2$ is constant over the entire range of the luminance $Y_2$.

15. An image conversion apparatus according to claim 13, wherein within a continuous fourth range within the third range of the luminance $Y_2$, the coefficient $C_1$ assumes a constant positive value, and the coefficient $C_2$ assumes a constant negative value.

16. An image conversion apparatus according to claim 14, wherein within a continuous fourth range within the third range of the luminance $Y_2$, the coefficient $C_1$ assumes a constant positive value, and the coefficient $C_2$ assumes a constant negative value.

17. An image conversion apparatus according to claim 12, wherein $C_2/C_1$ is a monotonic decreasing function of the luminance $Y_2$ in a broad sense in the first range of the luminance $Y_2$ and is a monotonic increasing function of the luminance $Y_2$ in a broad sense in the second range of the luminance $Y_2$.

18. An image conversion apparatus according to claim 13, wherein $C_2/C_1$ is a monotonic decreasing function of the luminance $Y_2$ in a broad sense in the first range of the luminance $Y_2$ and is a monotonic increasing function of the luminance $Y_2$ in a broad sense in the second range of the luminance $Y_2$.

19. An image conversion apparatus according to claim 16, wherein $C_2/C_1$ is a monotonic decreasing function of the luminance $Y_2$ in a broad sense in the first range of the luminance $Y_2$ and is a monotonic increasing function of the luminance $Y_2$ in a broad sense in the second range of the luminance $Y_2$.

20. An image conversion apparatus according to claim 15, wherein the coefficient $C_1$ assumes a constant positive value in a range which includes the entire fourth range of the luminance $Y_2$ and covers a greater range than the fourth range.

21. An image conversion apparatus according to claim 14, wherein $C_1$ is zero in a continuous fifth range where the luminance $Y_2$ assumes the minimum value; $C_2$ is zero in a continuous sixth range where the luminance $Y_2$ assumes the maximum value; and $C_1$ is a constant positive value and $C_2$ is a constant negative value within at least a continuous portion between the fifth and sixth ranges.

22. An image conversion apparatus according to claim 12, wherein the low-frequency-image extraction means extracts the low frequency image based on one dimension frequency analysis along each pixel line.

* * * * *